(12) United States Patent
Choate et al.

(10) Patent No.: US 11,535,483 B2
(45) Date of Patent: *Dec. 27, 2022

(54) REDUCED SIZED WEARABLE RETRACTABLE

(71) Applicant: Reliance Industries, LLC, Wheat Ridge, CO (US)

(72) Inventors: Gary E. Choate, Lakewood, CO (US); Joshua Smith, Arvada, CO (US); Austin Sagel, Westminster, CO (US)

(73) Assignee: RELIANCE INDUSTRIES, LLC, Arvada, CO (US)

( * ) Notice: Subject to any disclaimer, the term of this patent is extended or adjusted under 35 U.S.C. 154(b) by 424 days.

This patent is subject to a terminal disclaimer.

(21) Appl. No.: 16/050,699

(22) Filed: Jul. 31, 2018

(65) Prior Publication Data

US 2019/0135577 A1 May 9, 2019

Related U.S. Application Data

(63) Continuation of application No. 15/492,767, filed on Apr. 20, 2017, now Pat. No. 10,351,385.

(51) Int. Cl.
*B65H 75/44* (2006.01)
*A62B 35/00* (2006.01)

(52) U.S. Cl.
CPC ..... *B65H 75/4428* (2013.01); *A62B 35/0093* (2013.01)

(58) Field of Classification Search
CPC ............ E04G 21/3204; A62B 35/0068; A62B 35/0093; A62B 35/04; A62B 35/00;

(Continued)

(56) References Cited

U.S. PATENT DOCUMENTS 3,442,466 A * 5/1969 Fritsche .............. B60R 22/3413
242/379.1
3,590,656 A * 7/1971 Lloyd, Jr. .......... B65H 75/4434
74/575

(Continued)

FOREIGN PATENT DOCUMENTS

GB 2496008 A * 5/2013 ......... A62B 35/0068
GB 2588927 A * 5/2021 ......... A62B 35/0093

*Primary Examiner* — Daniel P Cahn
*Assistant Examiner* — Candace L Bradford
(74) *Attorney, Agent, or Firm* — Sandberg Phoenix & von Gontard PC

(57) ABSTRACT

A pawl-less retractable comprises an inner frame with a drum-sperrad assembly mounted to the inner frame between side members of the frame to rotate relative to the frame and a stop cap which, during a fall, engages said drum-sperrad assembly to prevent further rotation of said drum. The inner frame can be pivotally mounted to the stop cap such that the inner frame and the drum-sperrad assembly pivot relative to the step cap, or the stop cap can pivot relative to the drum-sperrad assembly. The stop cap comprises a central body, a leading wing extending from a first side of the central body and a trailing wing extending from a second side of the central body opposite said first side. In use, the drum-sperrad assembly and the stop cap pivot relative to each other between an unlocked position in which the teeth of the sperrad are inside of an engagement zone circle and a locked position in which the teeth are outside of the engagement zone circle.

17 Claims, 22 Drawing Sheets

(58) Field of Classification Search
CPC ....... B65H 59/38; B65H 59/382; F16D 15/00; F16D 59/00
USPC ... 182/3, 231, 232, 233, 234, 235, 236, 237, 182/238, 239, 240, 241, 5, 70, 71, 72, 73, 182/74, 75
See application file for complete search history.

(56) References Cited

U.S. PATENT DOCUMENTS

| | | | | |
|---|---|---|---|---|
| 3,760,910 | A * | 9/1973 | Koshihara | F16D 59/00 188/180 |
| 4,511,123 | A | 4/1985 | Ostrobrod | |
| 4,877,110 | A | 10/1989 | Wolner | |
| 6,279,682 | B1 * | 8/2001 | Feathers | A62B 35/0093 182/239 |
| 7,210,645 | B2 * | 5/2007 | Paterson | A62B 35/0093 242/383.4 |
| 8,181,744 | B2 * | 5/2012 | Parker | A62B 1/10 182/232 |
| 8,991,556 | B2 * | 3/2015 | Auston | A62B 35/0093 182/234 |
| 9,132,301 | B2 * | 9/2015 | Jones | F16D 59/00 |
| 9,670,980 | B2 * | 6/2017 | Jones | F16F 7/087 |
| 10,004,927 | B2 * | 6/2018 | Choate | A62B 35/0093 |
| 10,653,903 | B2 * | 5/2020 | Jones | A62B 35/0093 |
| 2006/0054730 | A1 * | 3/2006 | Paterson | A62B 35/0093 182/232 |
| 2009/0211849 | A1 * | 8/2009 | Smith | A62B 35/0037 182/231 |
| 2011/0278095 | A1 * | 11/2011 | Hetrich | A62B 1/10 182/231 |
| 2012/0031701 | A1 * | 2/2012 | Jones | A62B 35/0093 188/69 |
| 2012/0118670 | A1 * | 5/2012 | Olson | A62B 1/10 182/232 |
| 2016/0346572 | A1 * | 12/2016 | Choate | A62B 35/0093 |
| 2018/0161608 | A1 * | 6/2018 | Choate | A62B 35/0093 |

* cited by examiner

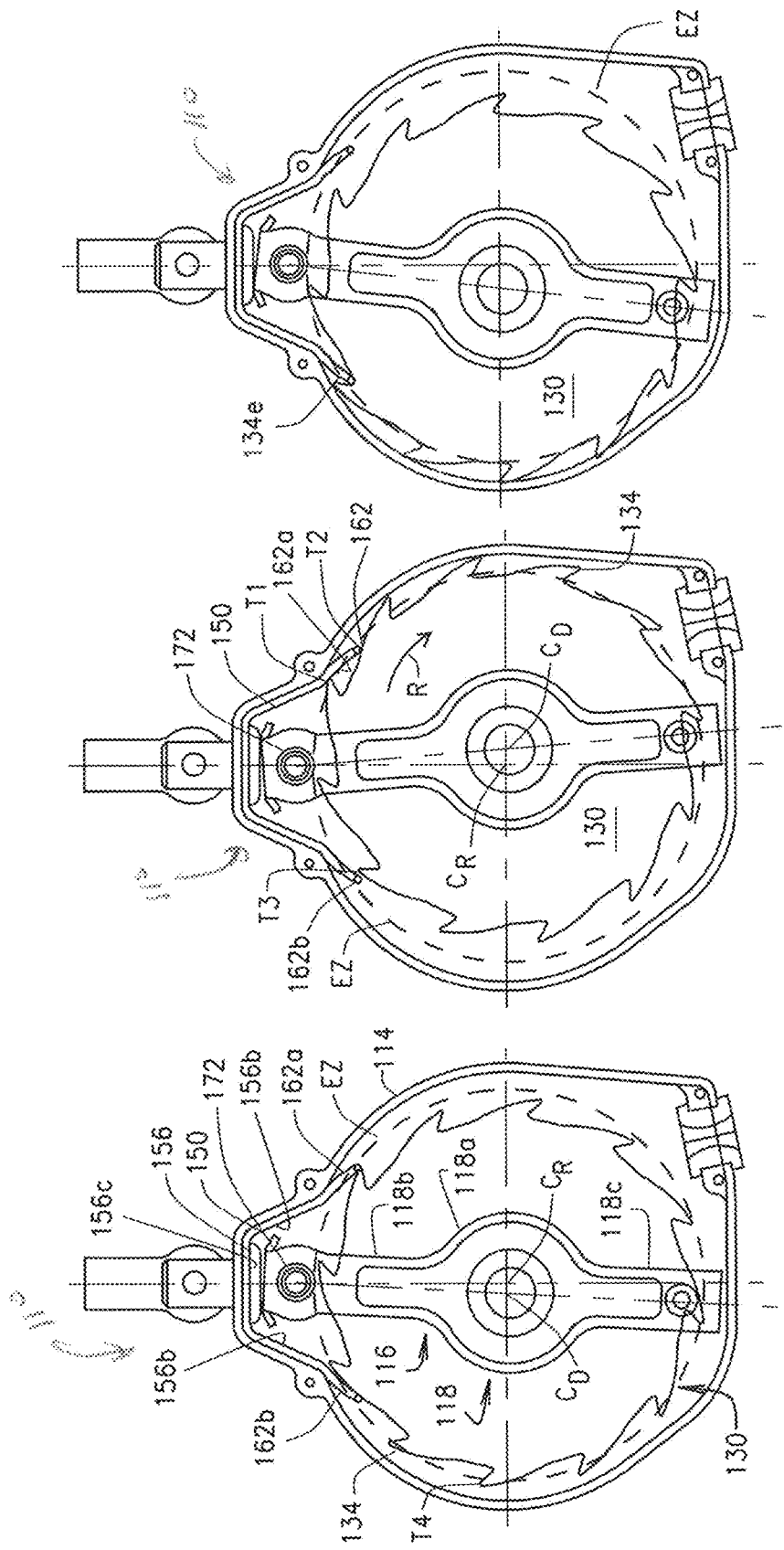

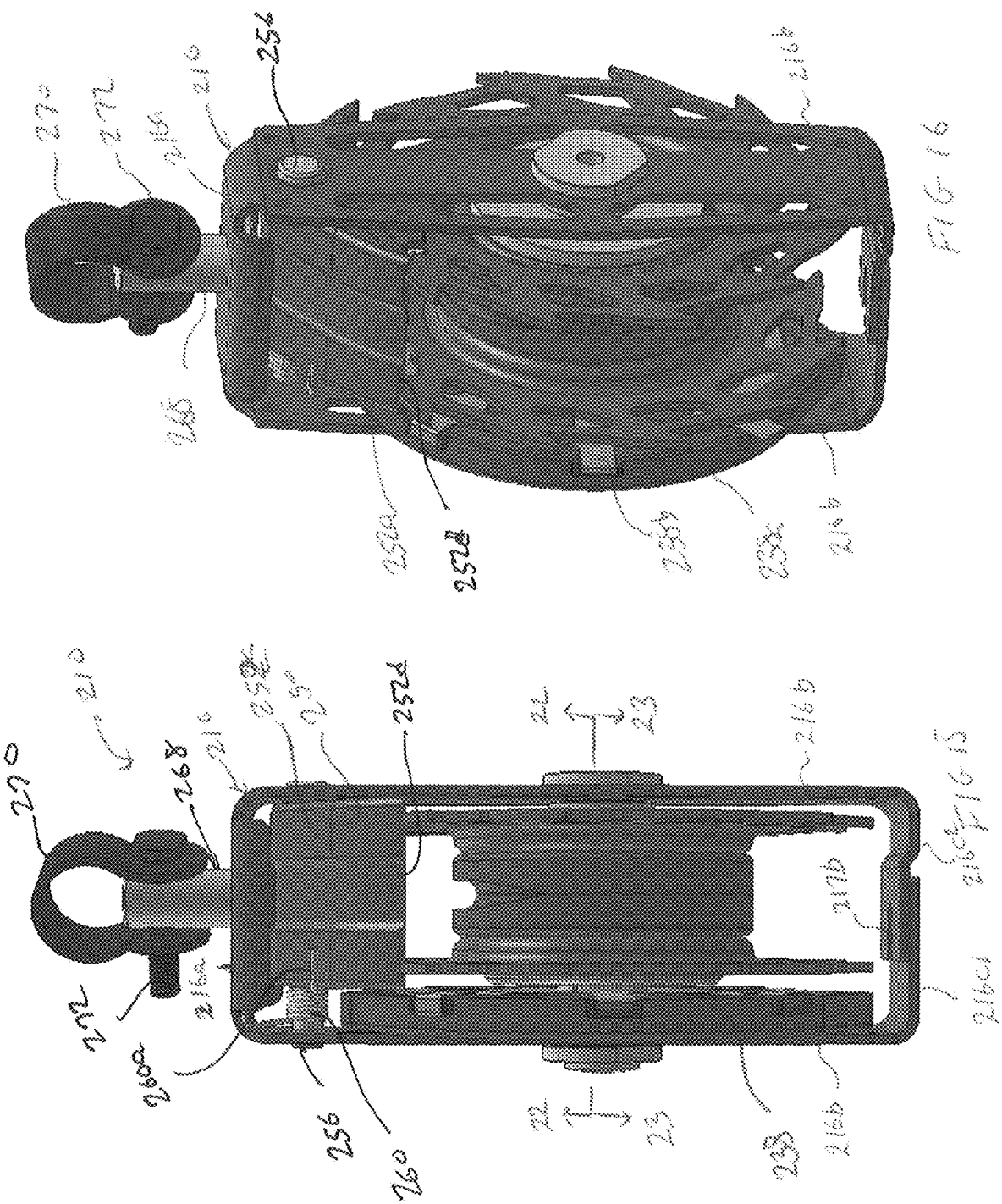

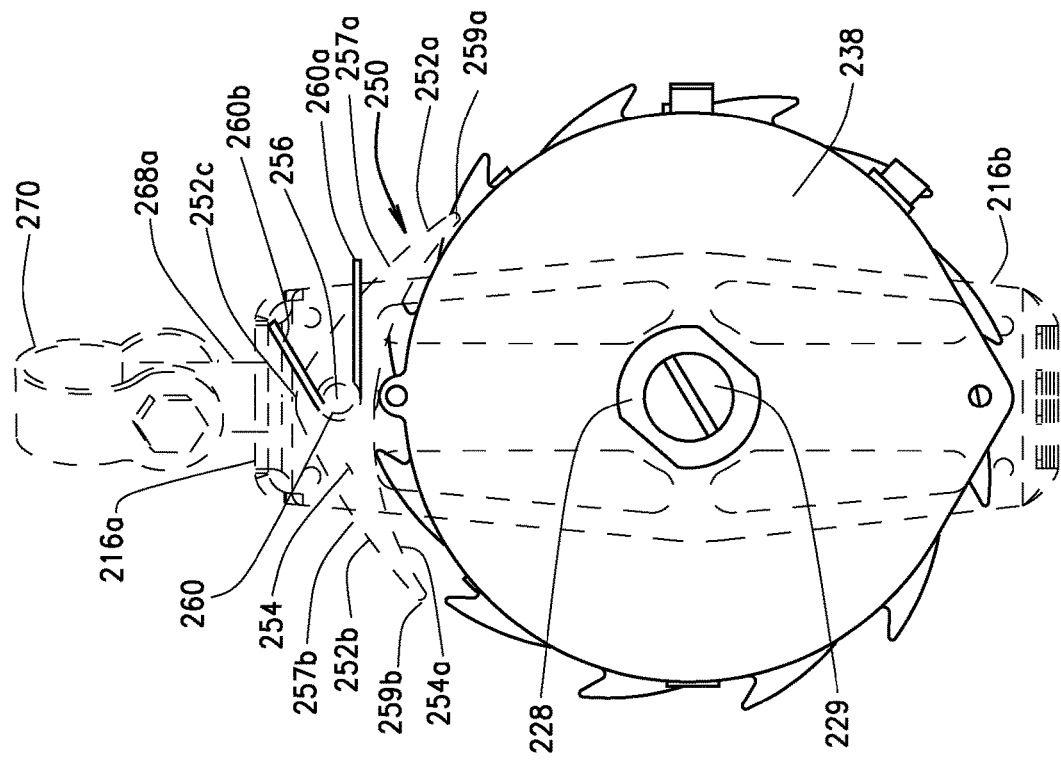
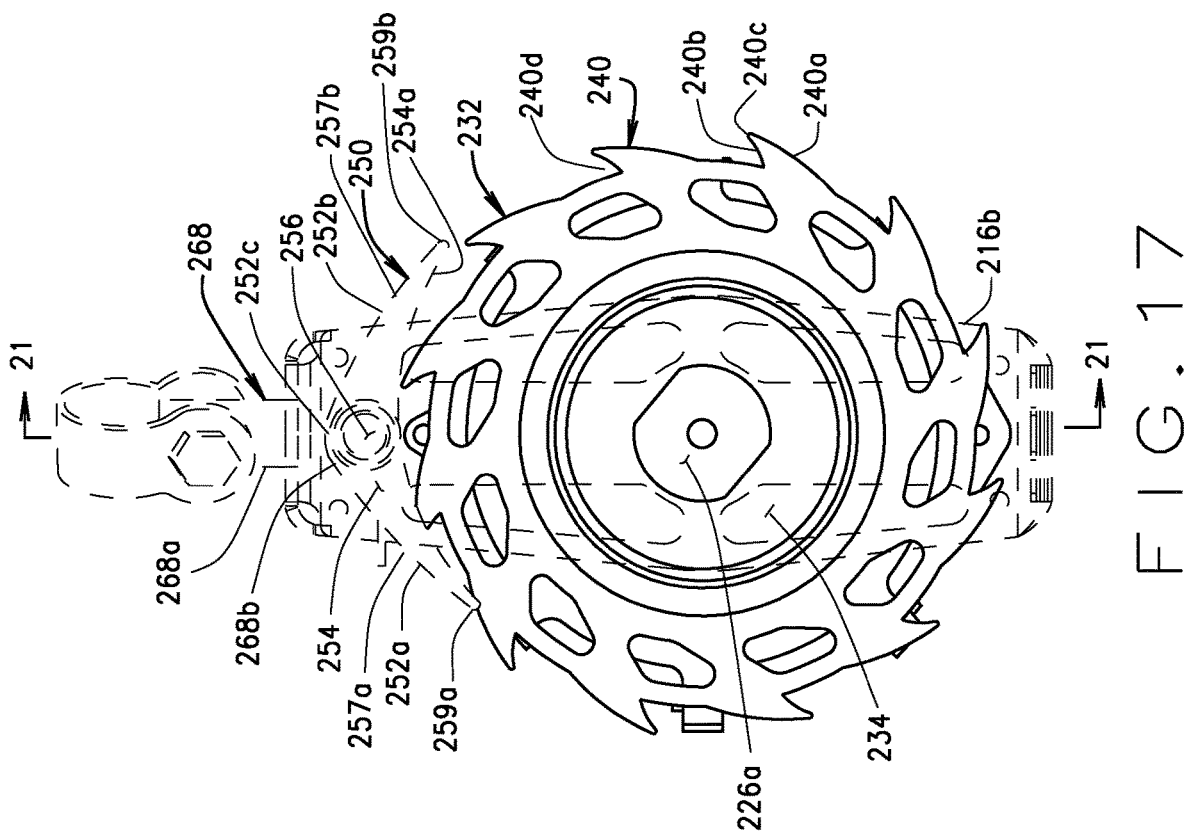

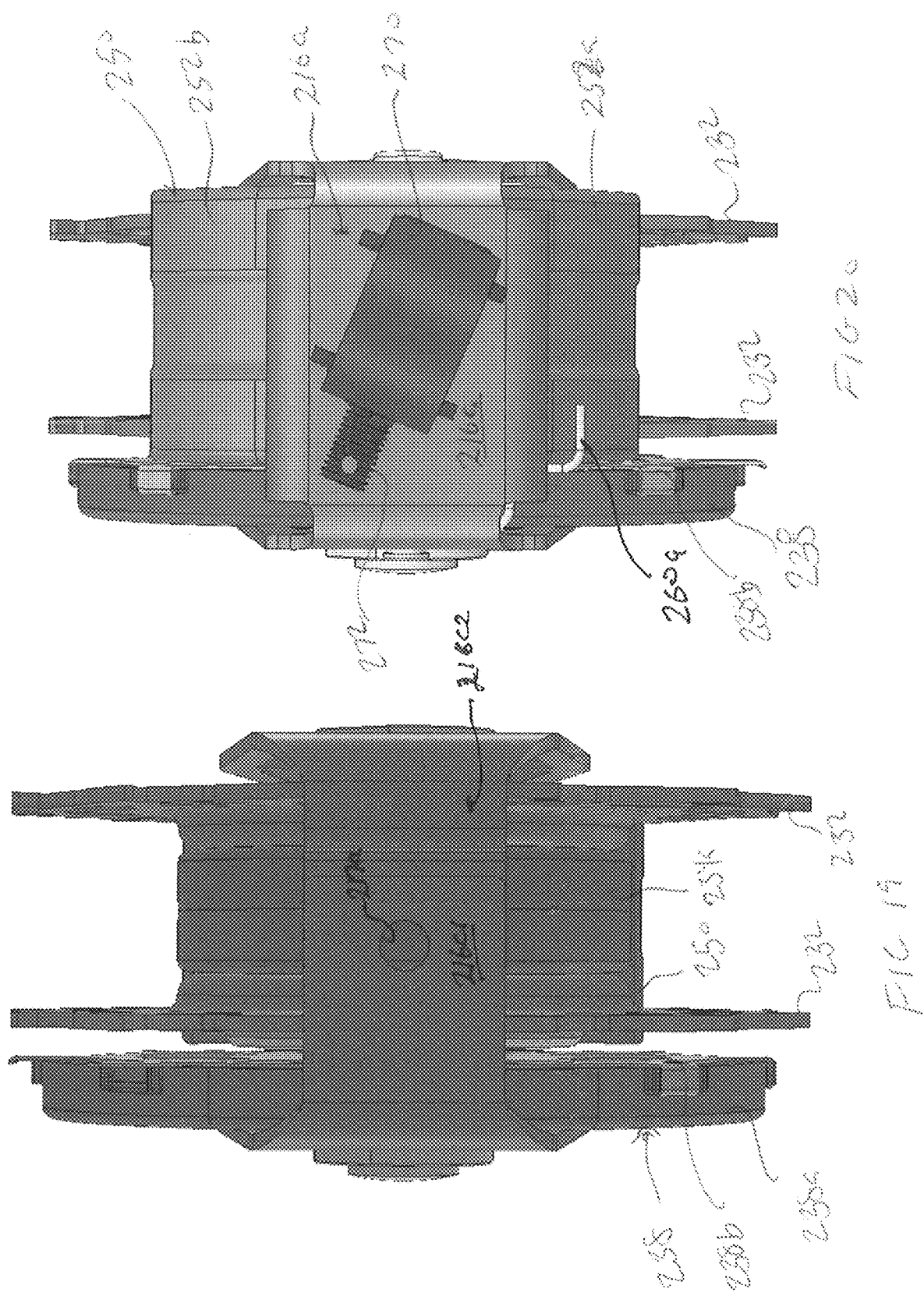

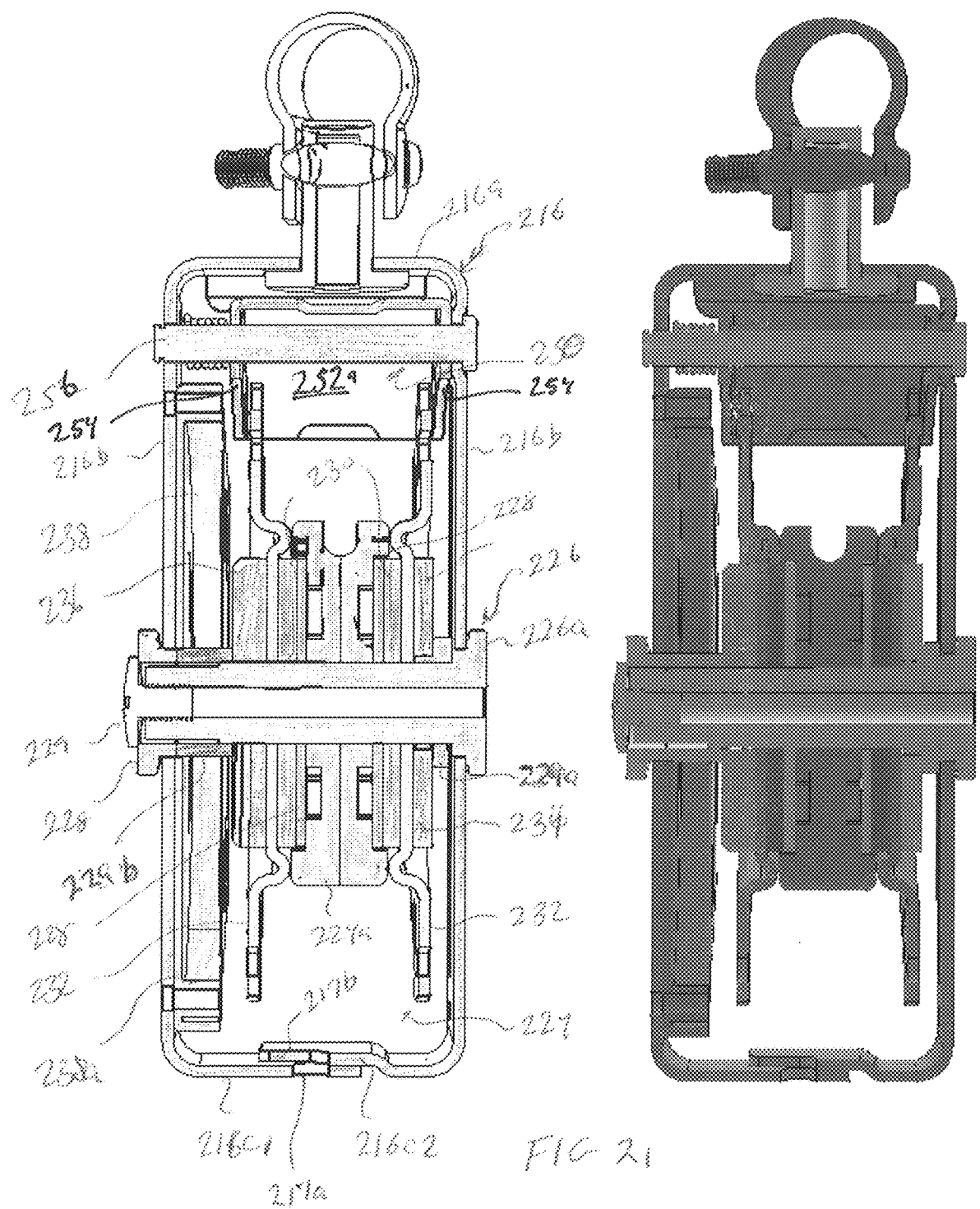

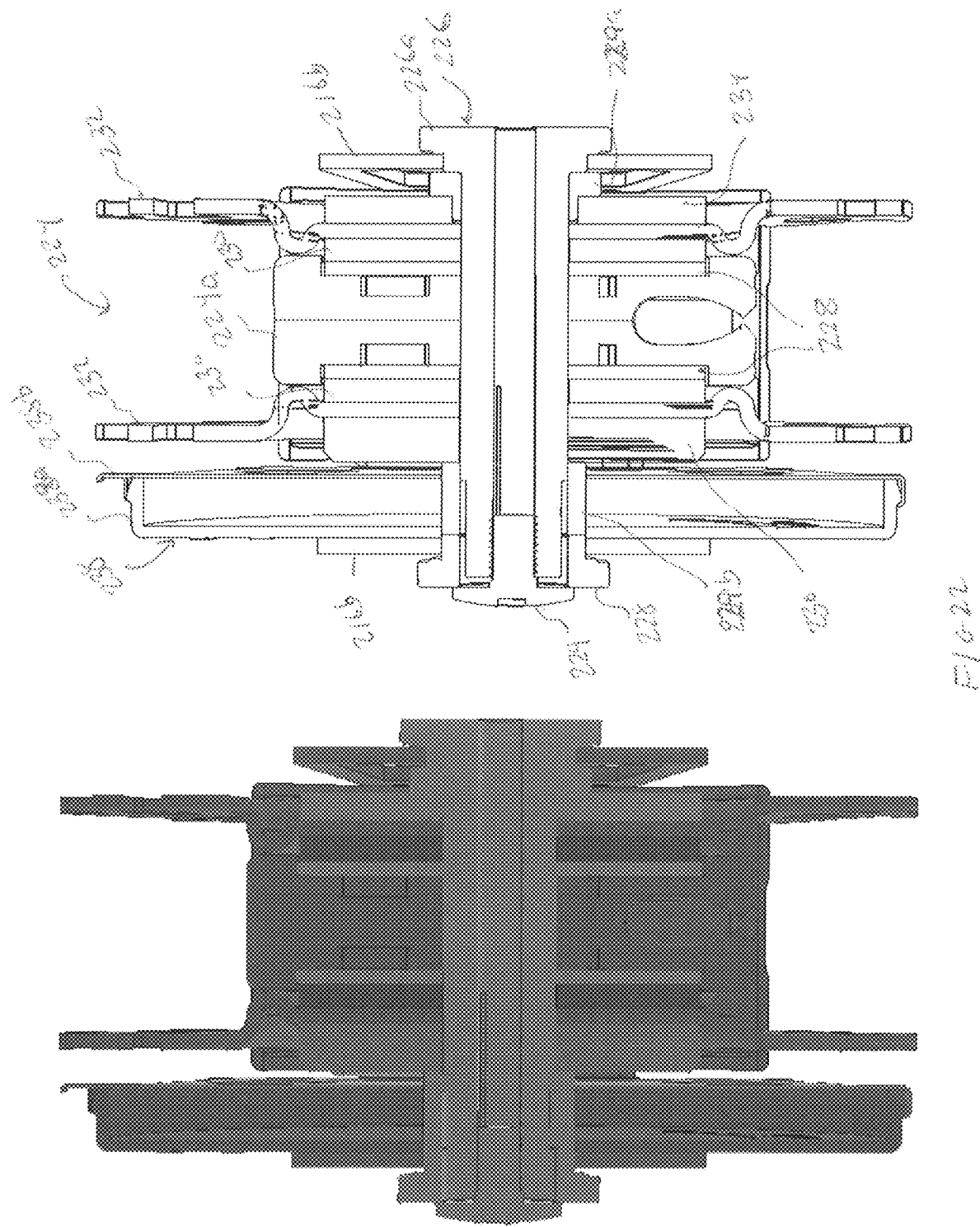

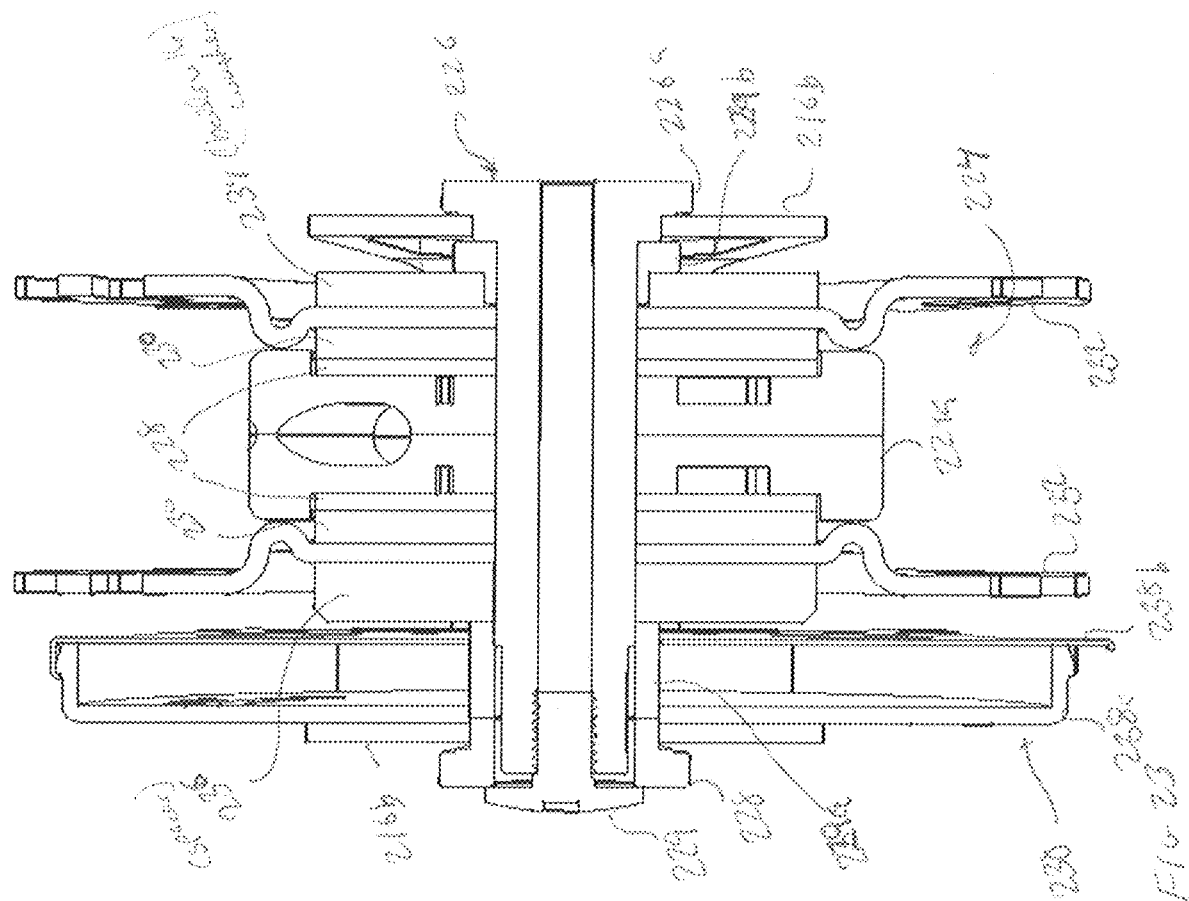
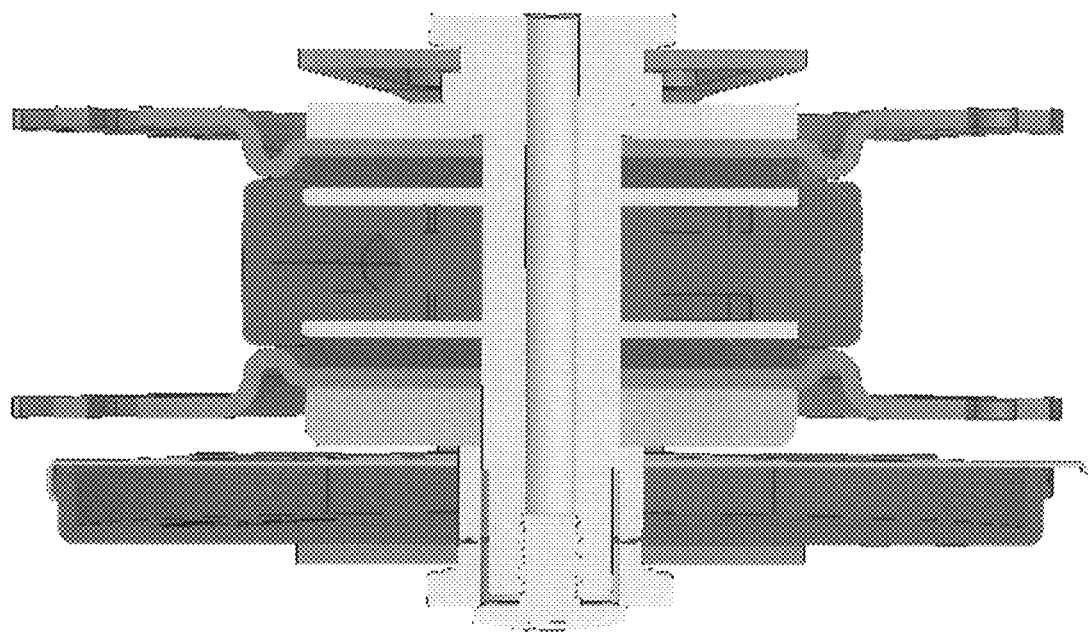

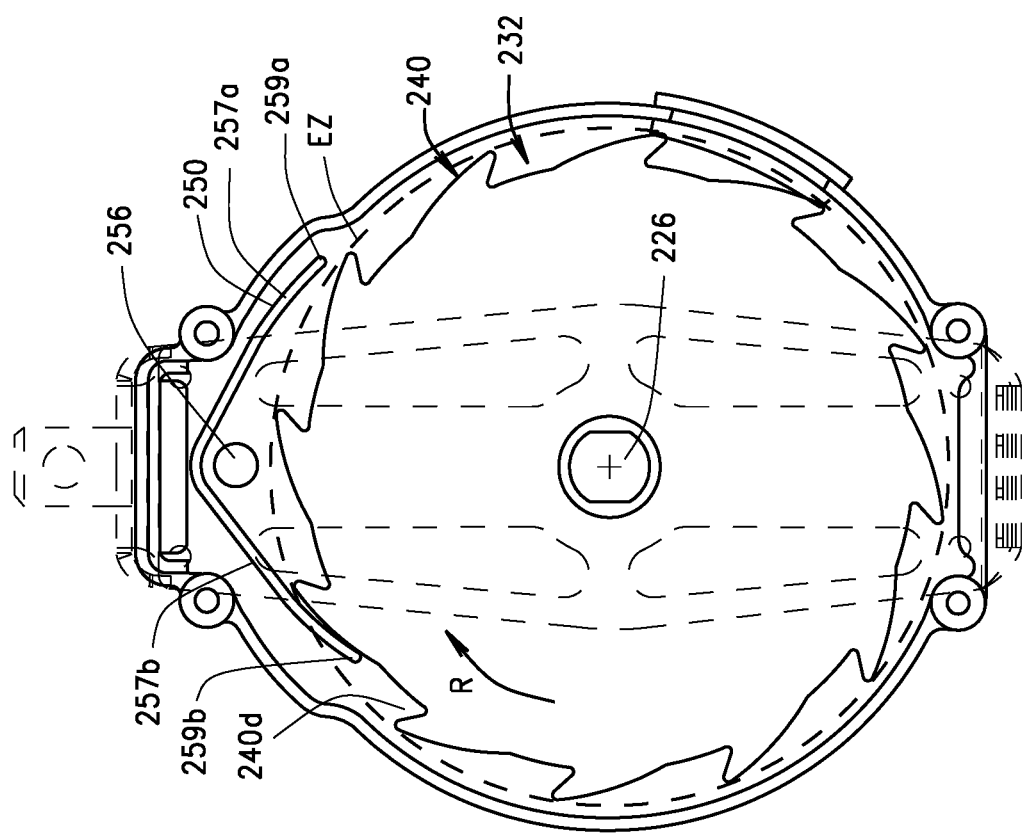
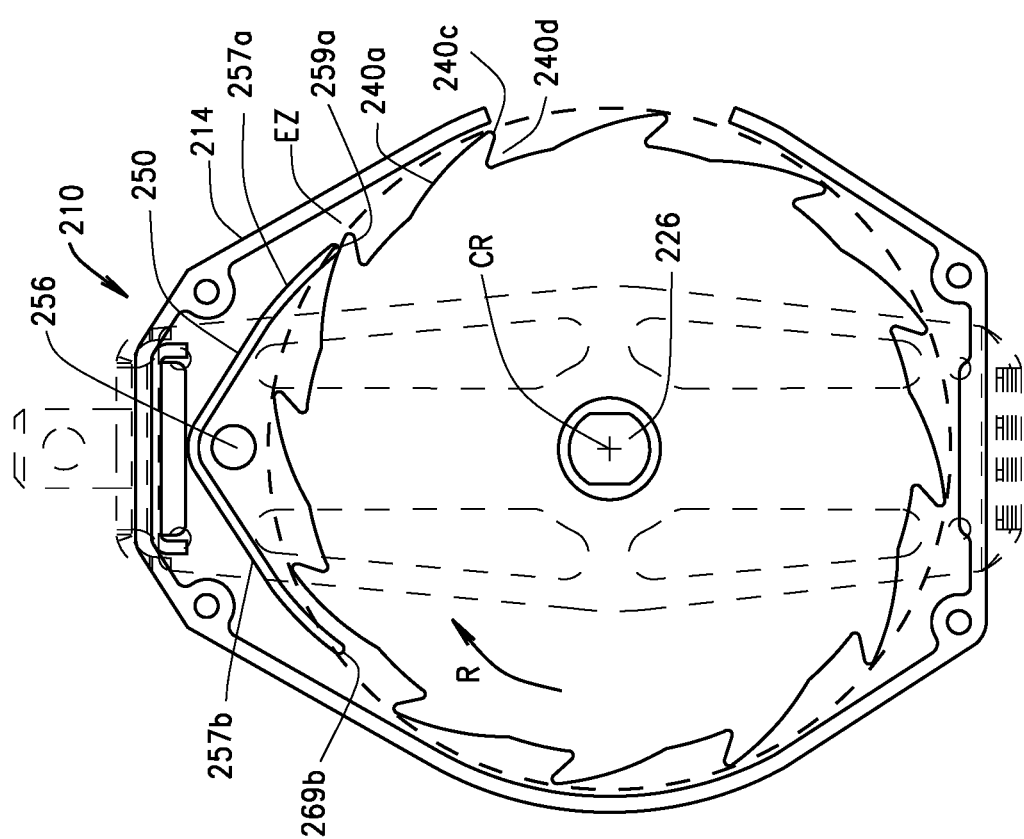

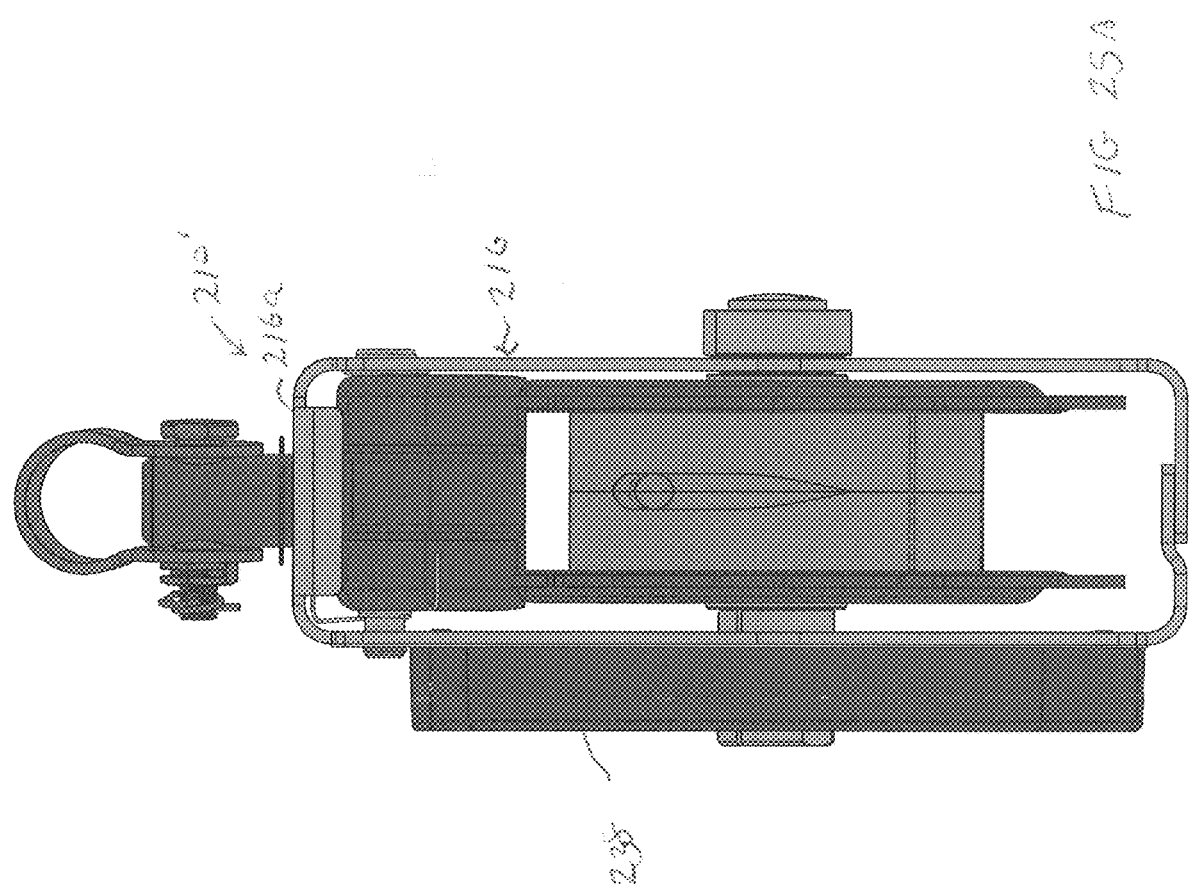

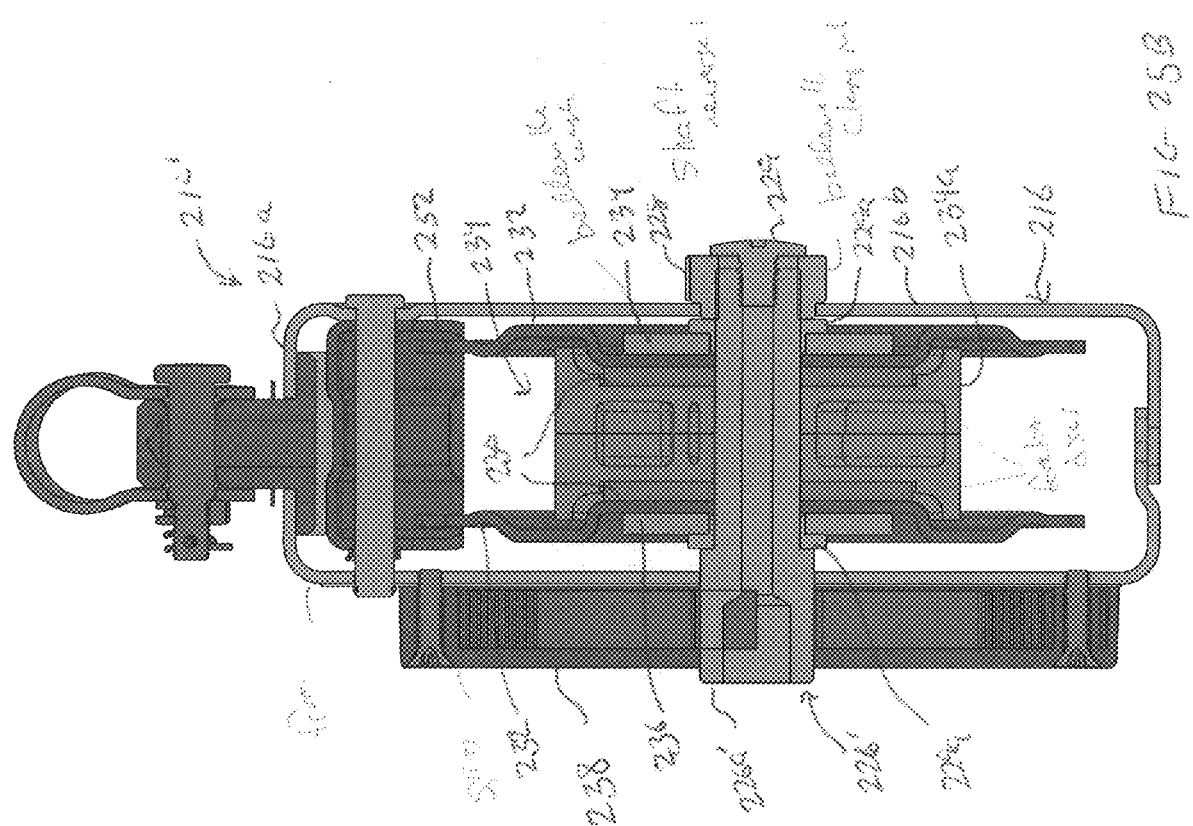

Before Fall

After Fall

REDUCED SIZED WEARABLE RETRACTABLE

CROSS-REFERENCE TO RELATED APPLICATIONS

This application is a continuation-in-part of U.S. application Ser. No. 15/492,767 which was filed on Apr. 20, 2017 and which is incorporated herein by reference.

STATEMENT REGARDING FEDERALLY SPONSORED RESEARCH OR DEVELOPMENT

Not Applicable.

BACKGROUND

This application relates to retractables, and in particular, to reduced-sized wearable retractables, i.e., retractables having a drum diameter of less than about 3.5".

Apart from reliability, modern design for wearable retractables is governed by two primary concerns or factors: reduced cost and reduced weight. This creates pressure for designers to micro-miniaturize their designs. A limiting factor in miniaturizing retractables is that the locking mechanism (the pawls in particular) must also be miniaturized to fit in increasingly smaller housings. The minimum required strength of the pawls limits the size reduction of the retractable due to the fall arrest forces that these locking mechanisms must endure.

It would be beneficial to provide a wearable retractable that overcame this limitation of size reduction.

BRIEF SUMMARY

The retractable disclosed herein overcomes the above noted problem by eliminating the traditional pawl entirely. This is accomplished by providing sperrad teeth on clutch mounted sperrad plates outside the drum periphery (i.e., proximate or adjacent the drum walls) and allowing the drum to rock back and forth in the housing to duplicate the function of a traditional pawl. In essence, the function of the traditional pawl is replaced with a rocking drum/sperrad which engages a stop member or stop cap mounted in the housing of the retractable.

Illustratively, the retractable comprises an inner frame with a drum assembly and at least one sperrad mounted between side members of the frame to rotate relative to the frame. The sperrad and drum assembly are rotationally fixed relative to each other by use of a spring loaded clutch mechanism. The sperrad comprises a sperrad body with a plurality of teeth extending from a periphery of the pivotal sperrad body to the tip of the sperrad teeth.

The inner frame supporting the drum-sperrad is pivotally mounted to a stop member, in the form of a stop cap, such that the stop member and frame, and hence the drum, can pivot relative to each other. The stop cap comprises a central body, a leading wing extending from a first side of the central body and a trailing wing extending from a second side of the central body opposite said first side. A circle, the center of which corresponds to the true center of the drum (and is thus concentric with the drum), is sized such that the edges of the leading wing and trailing wing are at the perimeter of the circle when the drum center is centered relative to the housing. This circle defines the inner diameter of an engagement zone. The stop cap is fixed to the wearer's harness or an anchorage by a swiveling yoke at the top of the retractable. Thus, in use, the inner frame, and hence the drum-sperrad sub-assembly, pivots back and forth relative to the stop cap and the engagement zone between an unlocked position and a locked position. In the unlocked position, the sperrad is in a position relative to the engagement zone circle such that the tips of the teeth of the sperrad leading into the trailing wing are within the engagement zone circle (i.e., the sperrad does not cross over the engagement zone circle and thus have not entered the engagement zone). In the locked position, the sperrad is in a position relative to the engagement zone circle, such that the tips of the teeth of the sperrad leading into the trailing wing are beyond the engagement zone circle such that the edge of the trailing wing of the stop cap is received in a space between the sperrad teeth. In the locked position, the leading wing of the stop cap provides a cam surface which pushes against the tip of the sperrad teeth, causing the sperrad teeth to be moved beyond the engagement zone circle to enter the engagement zone.

BRIEF DESCRIPTION OF THE DRAWINGS

FIG. 12 is a side elevational view of the retractable (with a housing portion removed) showing the sperrad/drum sub-assembly pivoted to a maximum position due to the engagement of the sperrad teeth with the leading surface of the stop cap;

FIG. 13 is a view similar to FIG. 12, but in which the sperrad/drum sub-assembly is in a by-pass (or unlocked) position in which the sperrad teeth will not engage the stop cap;

FIG. 14 is a view similar to FIG. 12, but in which the drum/sperrad sub-assembly is pivoted fully to the left (with reference to the figure) to be in a fully locked position in which the cap edge engages a pocket of the sperrad;

FIG. 15 is a side elevational view of a further embodiment of the retractable;

FIG. 16 is a perspective view of the retractable of FIG. 15;

FIGS. 17 and 18 are front and back elevational views of the retractable of FIG. 15 with the frame shown in phantom to better show the components of the retractable;

FIGS. 19 and 20 are bottom and top elevational views of the retractable of FIG. 15;

FIG. 21 is a vertical cross-sectional view of the retractable of FIG. 15 taken along line 21-21 of FIG. 17;

FIGS. 22 and 23 are horizontal cross-sectional views of the retractable of FIG. 15 taken along line 22-22 and 23-23, respectively of FIG. 15;

FIGS. 24A and 24B are cross-sectional views of the retractable of FIG. 15 showing the retractable in an unlocked position and a locked position, respectively;

FIGS. 25A and 25B are side elevational and vertical cross-sectional views, respectively, of a variation of the retractable of FIG. 15;

Corresponding reference numerals will be used throughout the several figures of the drawings.

DETAILED DESCRIPTION

Figure 1:
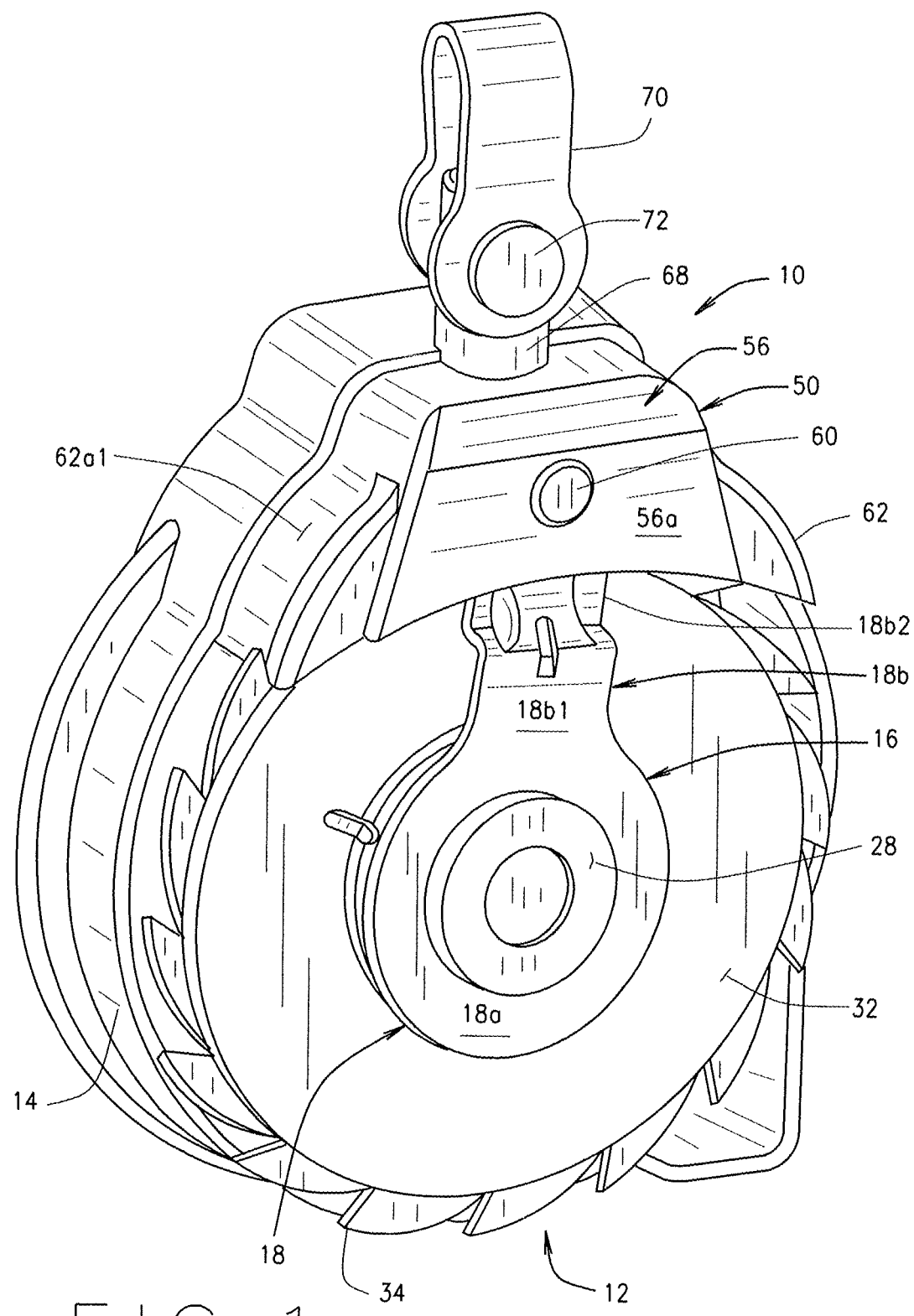
FIG. 1 is a perspective view of a retractable shown in a locked position with a portion of the housing removed.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what we presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

A first illustrative example of a retractable 10 is shown in FIGS. 1-10. The retractable 10 comprises a retractable assembly 12 contained in a housing which is made from two mating housing shells 14. The retractable assembly 12 comprises an inner frame 16 comprised of opposed side members 18 which extend downwardly from opposite ends of a top member 20. The side members 18 each comprise a lower plate 18a which is shown to be generally circular and a neck 18b extending upwardly from the top of the plate 18a to the edge of the top member 20. Aligned openings 22 are formed in the plates 18a. The neck 18b includes a first portion 18b1 which extends upwardly from the plate 18a, and a second portion 18b2 which extends upwardly from the first portion 18b1, but is stepped inwardly at 18b3 relative to portion 18b1. An inner portion of the neck 18b defines a horizontal step (which is generally parallel to an axis A (FIG. 4) of the retractable) and an angled portion. The top portion 20 includes sunken middle portion 20a.

Figure 2:
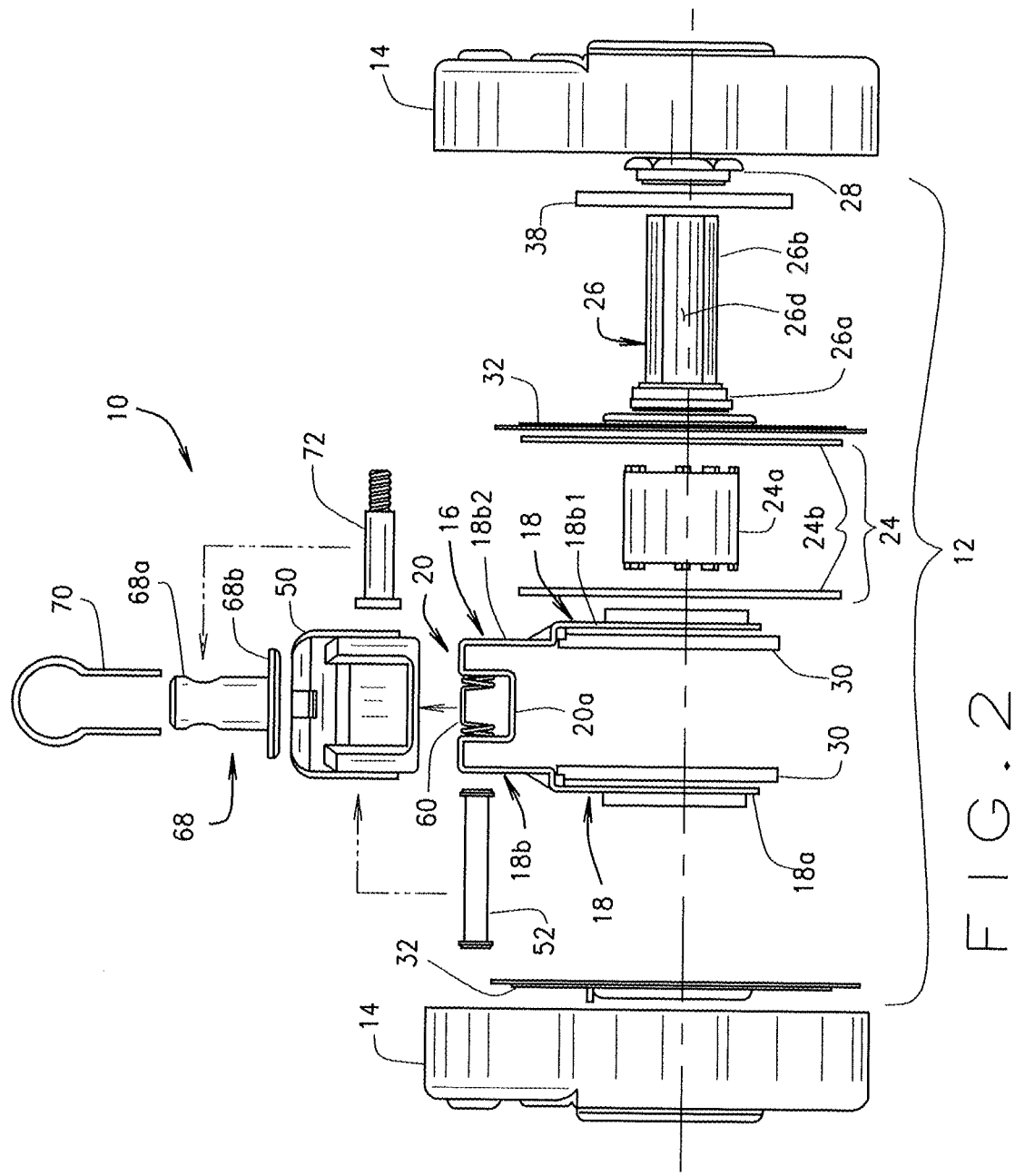
FIG. 2 is an exploded view of the retractable.
Figure 4:
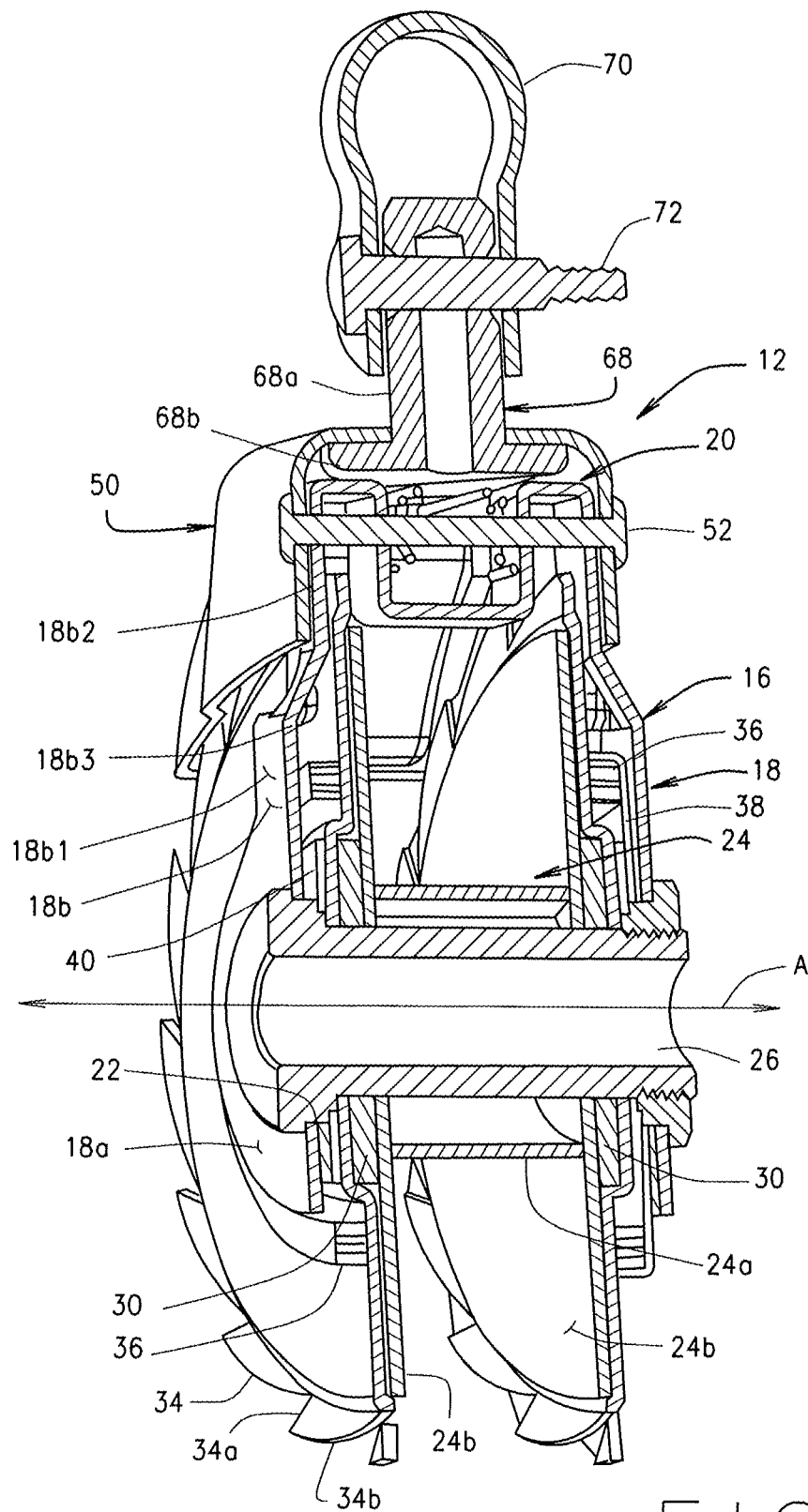
FIGS. 4 and 5 are perspective and side elevational cross-sectional views, respectively, of the retractable taken along line 4-4 of FIG. 3.
Figure 5:
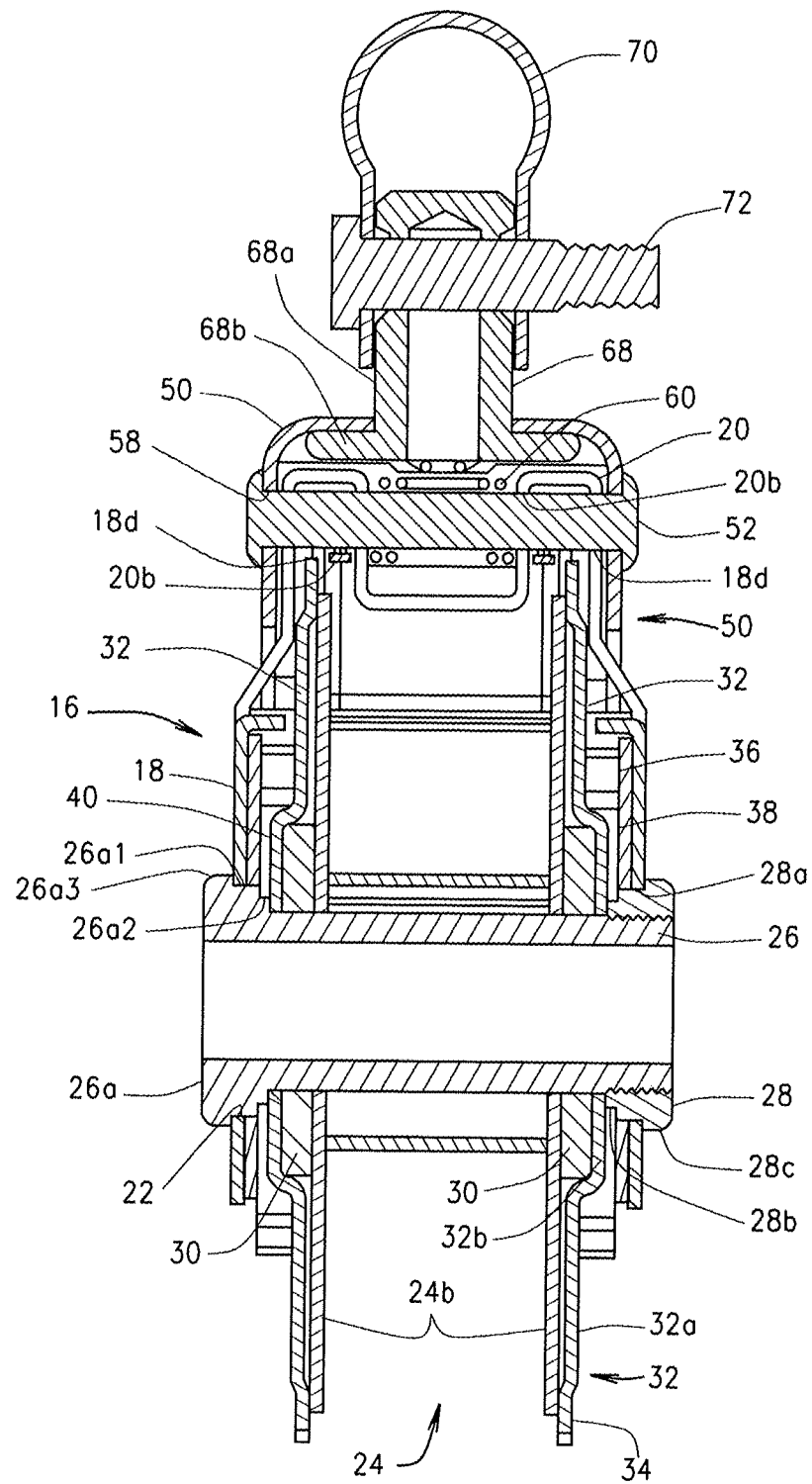

A drum assembly 24 is mounted between the inner frame's side members 18 on an axle 26. The drum assembly 24 comprises a cylindrical drum core 24a and opposed drum walls 24b. As seen in FIGS. 4 and 5, the axle 26 has a first enlarged end 26a, that is stepped down as at 26a1 and 26a2. The first step 26a1 is sized such to be received in the opening 22 of the inner frame side member 18, and such that the outer portion 26a3 of the axle end 26a has a diameter greater than the diameter of the inner frame side member opening 22. The first step 26a1 forms a bearing surface around which the drum assembly 24 rotates. An axle body 26b extends from the inner surface of the axle end member 26a a distance greater than the width of the inner frame 16, so as to extend beyond the opposite inner frame side member 18. The end 26c of the axle body 26b opposite the end member 26a is threaded to receive a hex nut 28. Like the axle end portion 26b, the hex nut 28 is stepped as at 28a and 28b. The first step 28a is sized to be received in the opening 22 of the inner frame side member 18, and with the outer portion 28c of the hex nut having a diameter greater than the diameter of the inner frame side member opening 22. The first step 28a forms a second bearing surface around which the drum assembly 24 rotates. The hex nut is threaded onto the axle body 26b to secure the axle 26 to the inner frame, as will be described below. As can be appreciated, the first steps 26a1 and 28a of the axle enlarged end 26 and the nut 28, respectively, have substantially the same diameters. The longitudinal center of the axle body thus defines the axis A about which the axle rotates relative to the frame 16. As seen in FIG. 2, axle body 26b and the axle end member 26a both have at least one flat surface 26d, with the planes defined by the flat surfaces of the axle body and the axle end member being parallel to each other. Preferably, the axle body has two flat surfaces, giving the axle body 26b a cross-section, as seen in FIGS. 6-9, of a circle flattened on opposite sides.

Friction discs 30 are positioned about the axle body 26b adjacent the outer surfaces of the drum walls 24b. The friction discs 30 are radially centered or generally coaxial with the frame opening 22 and the axle 26.

Sperrads 32 are mounted to the axle adjacent the friction discs 30. The sperrads are keyed to the axle to rotate with the axle, and thus with the drum until a fall occurs. The sperrads 32 have a central opening through which the axle body passes. Preferably, this opening corresponds in size and shape to the cross-sectional size and shape of the axle body to thereby fix the sperrads, in rotation but not in translation, relative to the cross-section of the axle. Illustratively, this central opening has flat edges (giving the opening a flattened circle or double "D" shape, i.e., ⏆) corresponding to the flat surfaces 26d of the axle body 26b. This, in effect, keys the axle in such a way that the sperrads are rotationally fixed relative to the axle so that the axle and sperrads rotate in unison. The sperrads can be keyed to the axle in any other desired manner.

Figure 6:
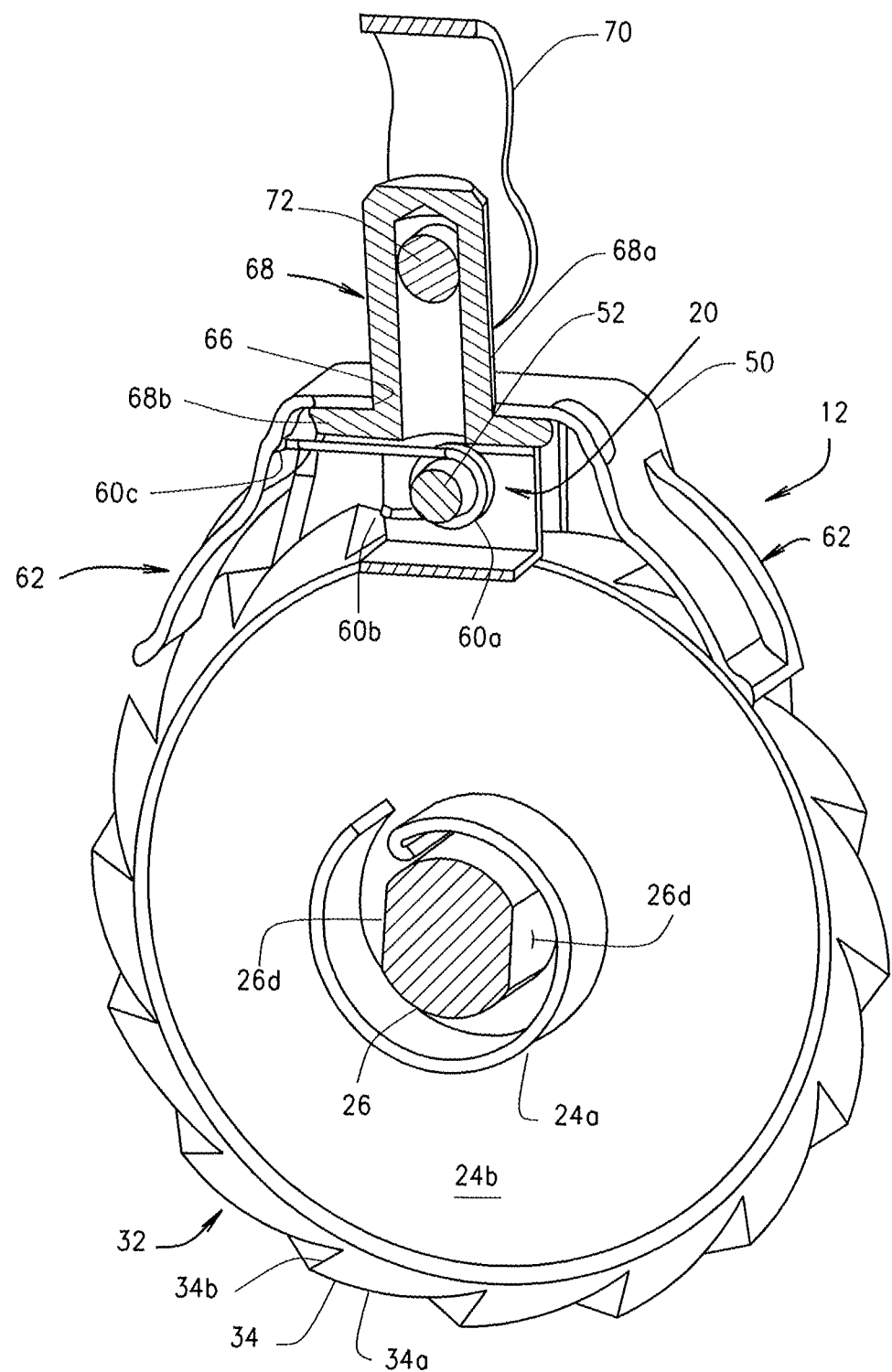
FIG. 6 is a transverse cross-sectional view of the retractable taken along line 6-6 of FIG. 3.

As seen, the sperrads 32 each have a main body 32a and a central portion 32b. The main body 32a has a diameter approximately equal to the diameter of the drum wall 24b. As seen, the main body 32a of the sperrad is adjacent an outer surface of the drum wall 24b, separated only by a friction disc. The sperrad central portion 32b protrudes outwardly from the sperrad main portion 32a to define a chamber sized to receive the friction disc 30. Thus, the friction disc 30 will be sandwiched between the sperrad and the drum wall. The sperrads also include sperrad teeth 34 around the outer periphery of the main body 32a. As seen in FIGS. 4 and 5, the teeth 34 are set inwardly slightly relative to the main body 32a of the sperrad 32. The inner surfaces of the teeth 34 are thus generally aligned with (or even slightly inside of the plane defined by) the drum walls 24b. With reference to FIG. 6, each tooth 34 comprises a trailing edge 34a which is generally arced and a leading edge 34b which extends from the end of the trailing edge 34a radially inwardly toward the perimeter of the sperrad main body 32a from a tip 34c of the tooth. As seen, the leading edge of each tooth also extends rearwardly, such that the junction between the leading edge 34b of the tooth and the sperrad main body 32a is radially inside of the trailing edge 34a defining an area 34d under or between each tooth 34. Additionally, the trailing edge 34a of each tooth extends from the base or inner end of the leading edge 34b of an adjacent tooth. The teeth are evenly spaced about the sperrad 32. The sperrad 32 illustratively shown in FIGS. 7-9 has sixteen teeth 34. The sperrads 32 could be made with more or fewer teeth, as may be desired. As is known, the number of sperrad teeth affects the lock-up speed (i.e., how quickly the retractable stops rotating in a fall situation). Thus, the number of sperrad teeth can be altered to achieve a desired lock-up speed. However, each sperrad 32 of the retractable has the same number of teeth, and in fact, are identical mirror images of each other, and are keyed to work together.

A spiral power spring 36 is received against the outer surface of each sperrad 32 and is enclosed by a spring housing 38. The spring housing is omitted on the left side of FIG. 5 for purposes of illustration. Depending on the capacity of the retractable, the retractable can contain just one power spring 36 or it can contain two power springs 36.

A Belleville washer 40 is mounted about the axle 26 concentrically with the spring 36. As seen in FIG. 5, one Belleville washer 40 is received on the step 26a2 of the axle end 26a to be sandwiched between the axle end 26b and the outer surface of the sperrad 32, and the other Belleville washer 40 is received on the step 28b of the hex nut to be sandwiched between the hex nut and the outer surface of the other sperrad 32. The unit may contain one or two Belleville washers. Alternatively stacks of multiple washers can be used, if the capacity of the retractable requires additional washers. As can be appreciated, when the drum assembly 24, friction discs 30, sperrads 32, and springs 36 are mounted to the axle 26 in the inner frame 16, the retractable members are sandwiched between the axle end 26a and the hex nut 28. The Belleville washers 40 ensure a friction fit, such that the drum will be frictionally fixed rotationally relative to the sperrad by means of the friction discs, such that the drum assembly and sperrads will rotate together and in unison until a fall occurs.

A lanyard, cable, webbing, etc. (not shown) is secured to the drum and wrapped about the drum. The cable has a free end to which, for example, a connector is mounted to connect the lanyard to the wearer's harness (or to an anchor if the retractable housing is connected to the wearer's harness). As the drum rotates, the cable is unwound from, or rewound onto, the drum, depending on the direction of rotation of the drum.

Figure 7:
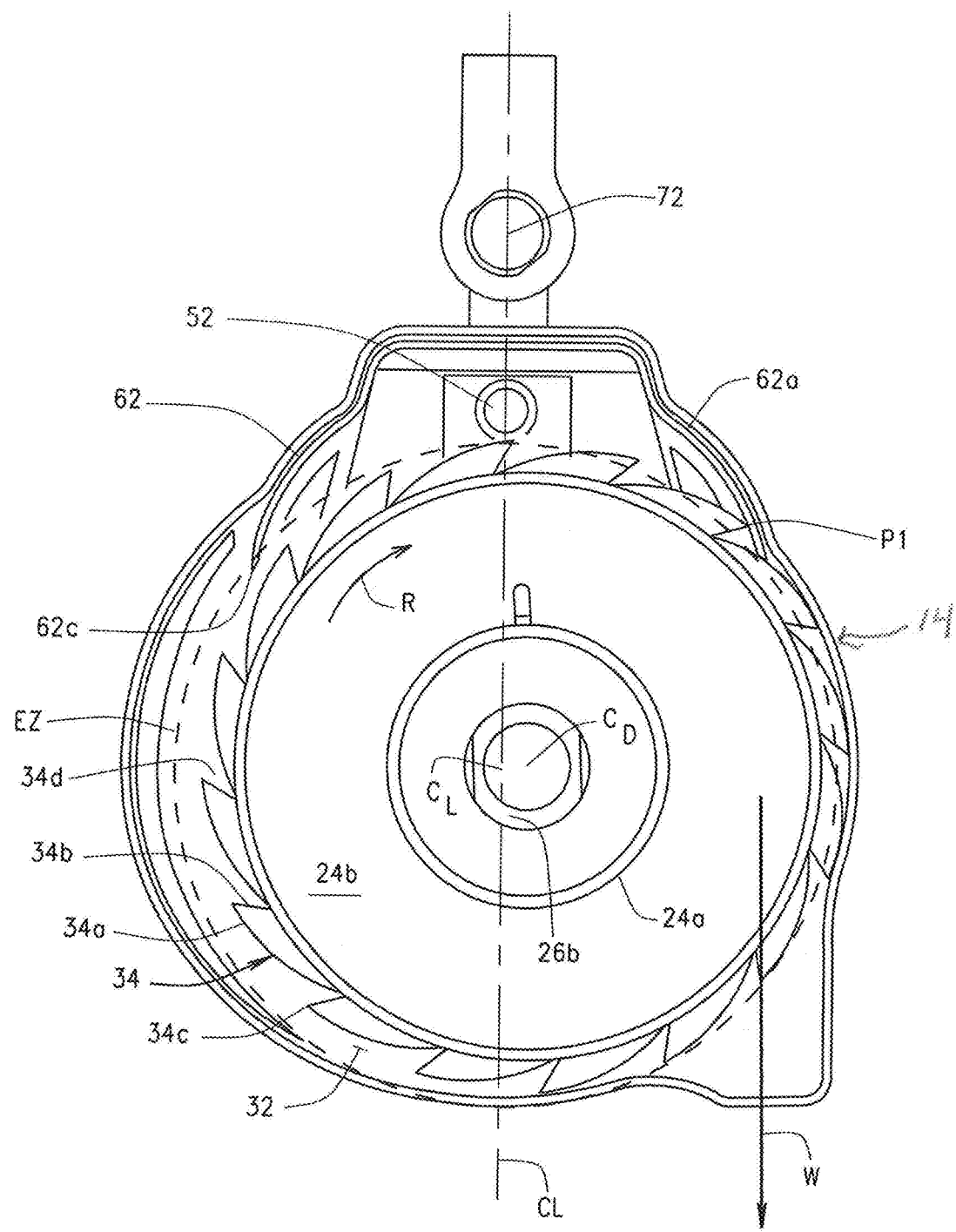
FIGS. 7-9 are cross-sectional views of the retractable, showing the retractable in an unlocked position (FIGS. 7 and 8) in which the retractable drum can rotate and a locked position (FIG. 9) in which the retractable drum is prevented from rotating.
Figure 8:
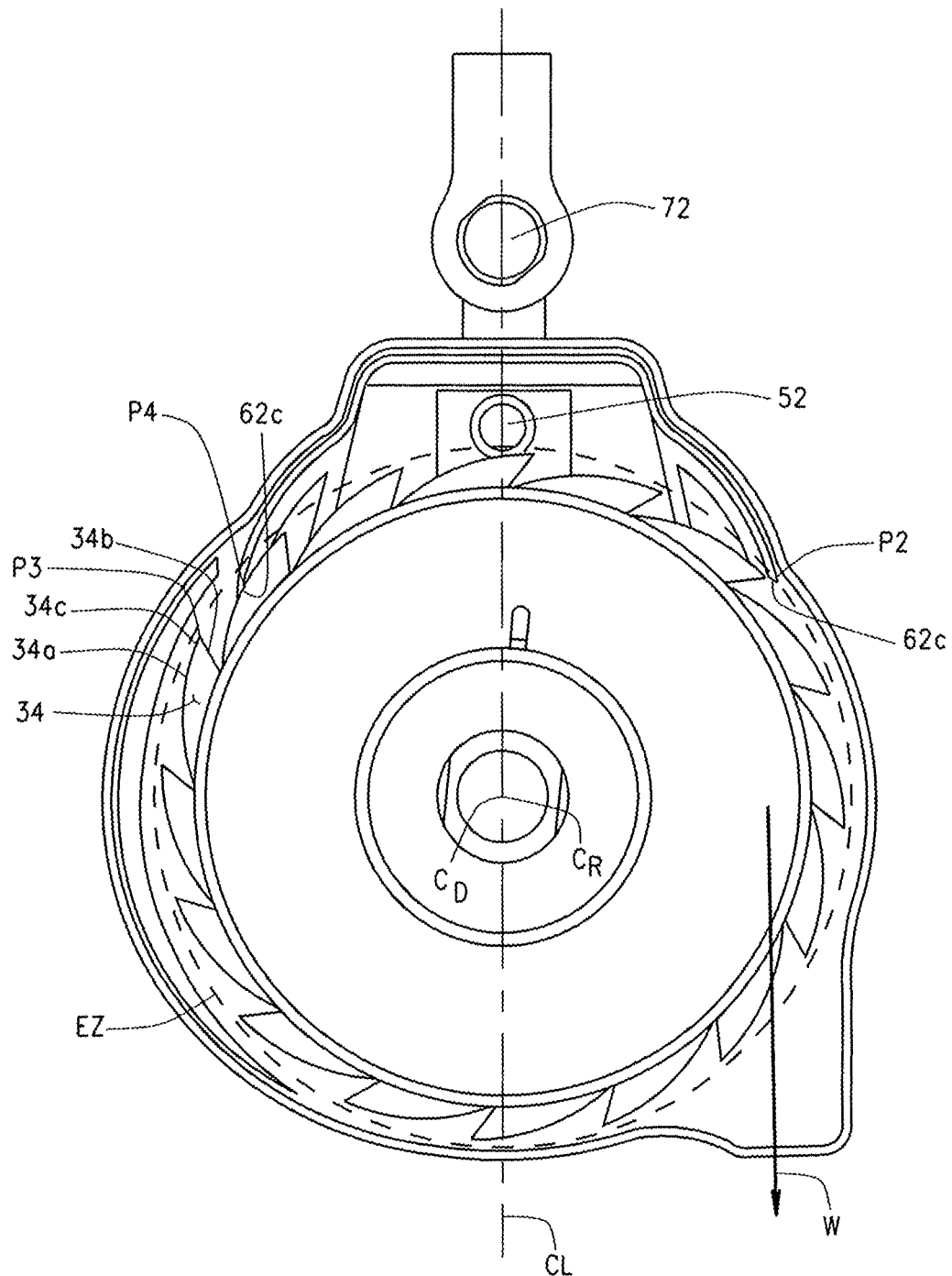
Figure 9:
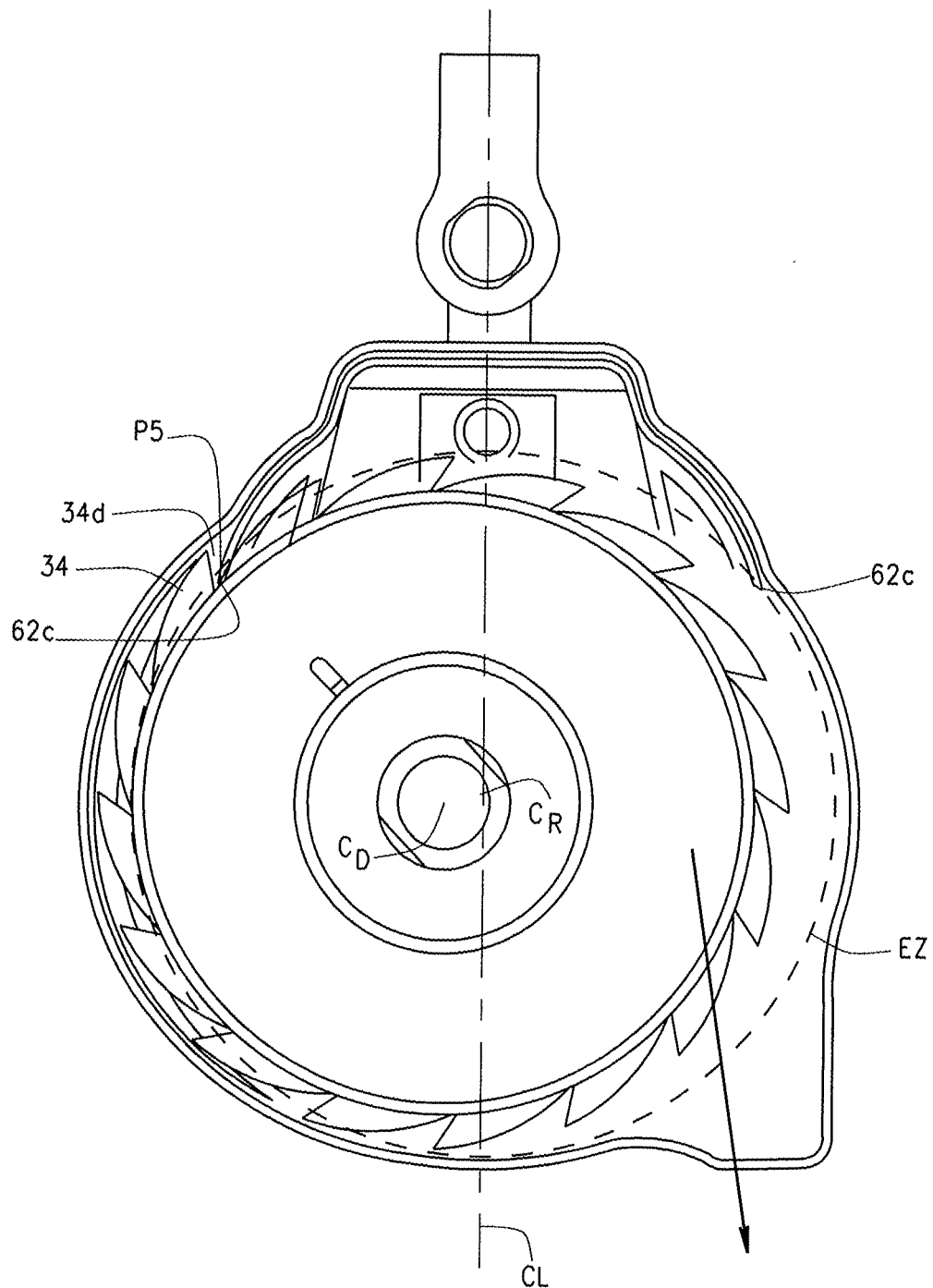
Figure 10B:
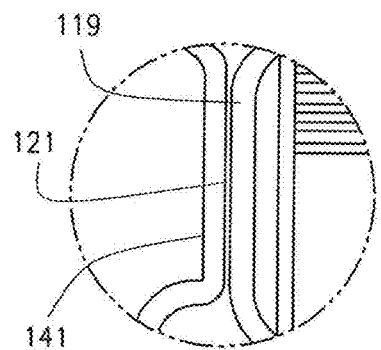
FIG. 10B is an enlarged fragmentary view taken along circle B of FIG. 10A.
Figure 10A:
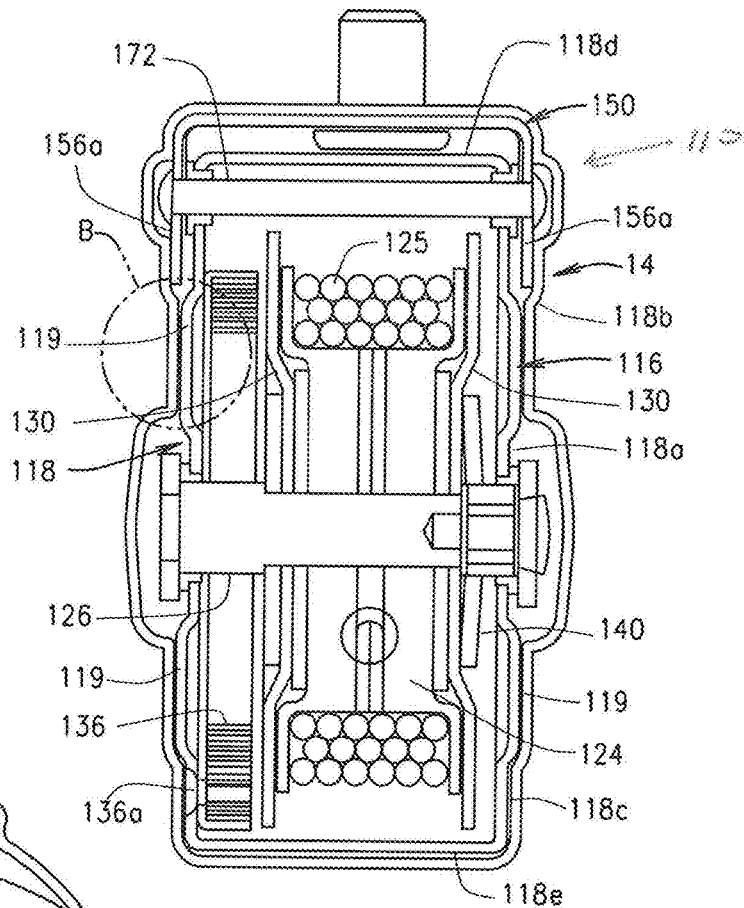
FIG. 10A is a cross-sectional view of an alternative embodiment of the retractable with the housing omitted for purposes of clarity.

The inner frame 16 is pivotally mounted to a stop member 50 by means of an upper shaft 52 which extends through the upper portion 18b2 of the neck 18b of the upper frame. As discussed below, the stop member is positionally fixed within the retractable housing. The stop member 50 is shown to be a stop cap, which overlaps or covers only a portion of the sperrads. The inner frame 16 includes aligned openings 18d in the upper portions 18b2 of the inner frame neck 18 and aligned openings 20b in the walls which define the sunken middle portion 20a of the inner frame top portion 20. The stop cap 50 has a central stop cap body 56 defined by side walls 56a, end walls 56b, and a top 56c. The side walls 56a include aligned openings 58 through which the top shaft 52 extends. Thus, as can be appreciated, the inner frame 16 (with the drum assembly and sperrad) can pivot about the top shaft 52 relative to the stop cap 50. As seen in FIGS. 7-9, the housing 14 has a side-to-side dimension sufficient to allow for the inner frame with the drum and spring to pivot about the top shaft 52 inside of the frame. A torsion spring 60 is received about the top shaft 52 in the sunken middle portion 20a of the inner frame top portion 20. The torsion spring 60 has opposed spiral portions 60a with ends 60b that are fixed to the inner frame and a central portion 60c between the spiral portions 60 that bear against the stop cap 50. Thus, the torsion spring 60 is operable to bias the inner frame 16 and the stop cap 50 to a normal or rest position relative to each other.

Figure 3:
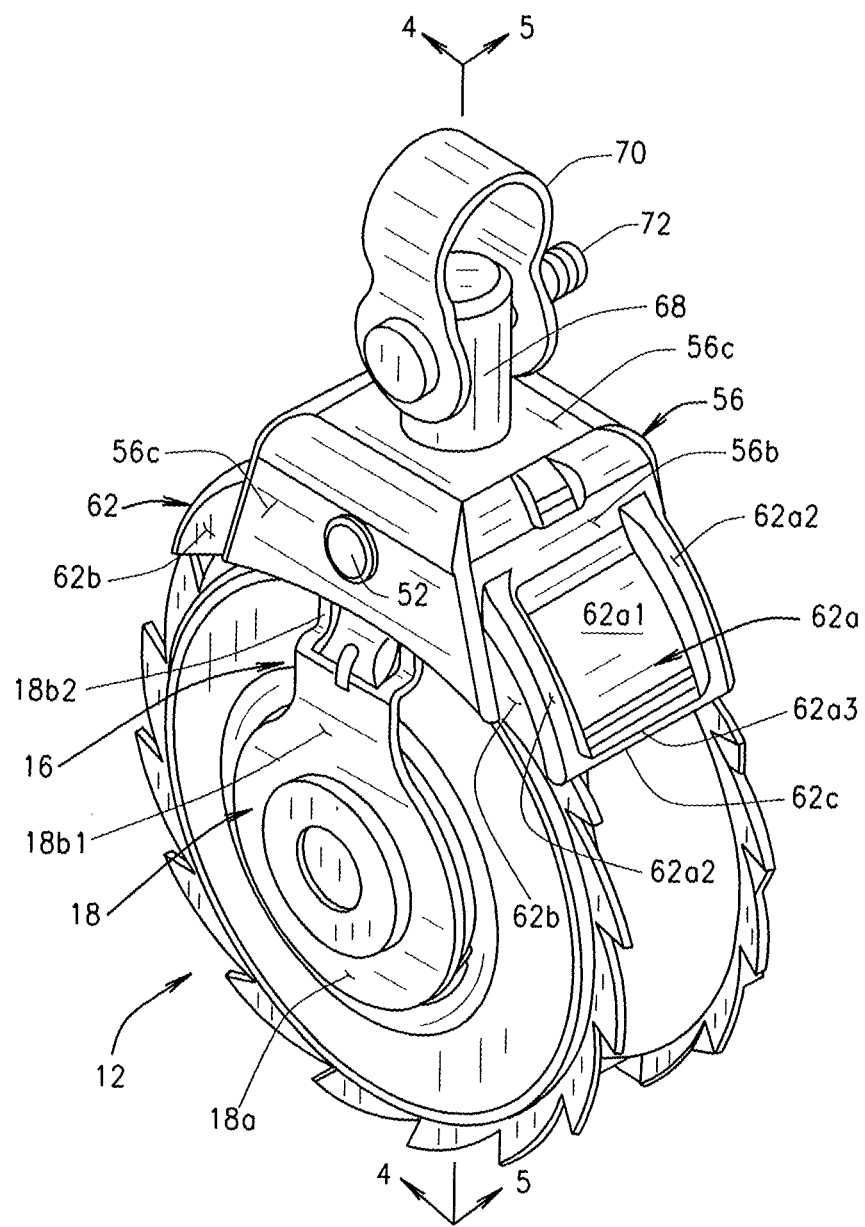
FIG. 3 is a perspective view of the retractable with the housing removed.

The stop cap 50 further includes a wing 62 extending from each of the end walls 56b. The wings 62, as best seen in FIG. 3, each comprise a curved surface 62a defined by a central portion 62a1 which is sunken relative to two side portions 62a2 and an end portion 62a3. The two side portions 62a2 and the end portion 62a3 define a frame around the periphery of the central portion 62a1. Side walls 62b extend from the side portions 62a2 to the end walls 56b of the stop cap main body 56. A lower edge 62c is formed at the edge of the end portion 62a3 and extends between the wing side walls 62b. The frame, defined by the side portions 62a2 and end portion 62a3, increases the strength of the wings 62, thereby allowing for the stop cap to be made of a lighter weight and thinner material. Provided the stop cap is of sufficient strength and thickness, the stop cap could also be made with a flat leading edge without the necessity of adding the frame. Further, the side portions 62a2 of the frame define a radius sized to receive the sperrad teeth 34. By having the enlarged radius area defined by the side portions 62a2 of the frame, the stop cap inner surface radius (i.e., the radius of the central portion 62a1) between the sperrad tips is lower than the sperrad tips. This helps prevent the webbing, lanyard, cable, etc. on the drum from being able to ride up over the sperrad tips during use of the retractable which could jam the sperrad and thereby prevent the retractable from working.

Lastly, the stop cap 50 has an opening 66 in its top surface 56c through which the shaft 68a of a swivel top 68 passes. The swivel top 68 further includes a bottom disc 68b which is positioned in the stop cap top main body between the top of the inner frame and the stop cap top surface 56c. A swivel yoke 70 is pivotally connected to the swivel top 68 by means of a pin 72 (such as a clevis pin). The stop cap 50 is thus fixed to the swivel top 68.

With reference to FIG. 8, the retractable has an engagement zone defined by an imaginary circle EZ which is aligned with the center CR of the retractable and which is concentric with the drum (aligned with the center CD of the drum) when the drum center is aligned with the vertical center line CL of the housing. The circle EZ has a radius which extends from the retractable center CR to the end of the stop cap wings 62. The circle EZ defines the inner perimeter of the engagement zone.

The stop cap 50, and more particularly, the wings 62, are sized and shaped such that as the drum and sperrad rotate relative to the stop cap 50 in the direction of the arrow R (FIG. 7), the lower or end edge 62c of the leading wing (on the right with respect to FIGS. 7-9) will ride on the teeth 34 of the sperrad 32 and such that the lower or end edge 62c of the trailing wing (on the left with respect to FIGS. 7-9). As noted below, the inner frame 16, and thus the axle 26, and the drum assembly 24 and sperrads 32 (all of which in combination define a pivot assembly), pivot relative to the stop cap 50 about a pivot axis defined by the shaft 52. Thus, the center CD of the axle (and therefore, the center of the drum and sperrads) moves in an arc across a vertical centerline CL of the retractable which extends through the shaft 52. The radius of this arc is thus the distance between the shaft 52 and the center CD of the drum-sperrad assembly. As noted above, the spring 60 biases the pivot assembly to the position shown in FIG. 7 to urge the sperrad tooth tip 34c against the inside surface 62a of the leading wing 62 (on the right side of the stop cap 50 with respect to FIG. 7). In this position, the center C of the axle is to the right of the vertical centerline CL of the retractable. As the sperrad and drum rotate in a direction indicated by the sperrad teeth 34 (i.e., by the direction of the arrow R (FIG. 7) which is in a clockwise direction with reference to FIGS. 7-9), the tips 34c of the teeth will push against the inner surface of the leading (right side) wing to cause the pivot assembly to pivot through the position shown in FIG. 8 to the position shown in FIG. 9 in which the center CD of the axle is to the left of the vertical center line CL of the retractable. When the tip of a tooth clears the edge 62c of the leading wing, the spring 60 will force the pivot assembly in the opposite direction to return the pivot assembly to the position shown in FIG. 7 in which the center C of the axle is on the right side of the vertical centerline CL.

As can be appreciated, this back and forth pivoting of the pivot assembly causes the sperrads 32 to move back and forth relative to the stop cap 50 and the engagement zone circle EZ between a locking position (FIG. 9) in which the sperrad teeth extend outside of the engagement zone circle EZ on the trailing wing side (left side with reference to FIGS. 7-9) of the circle EZ and an unlocked position (FIG. 7) in which the sperrad teeth extend outside the circle EZ on the leading wing side (right side with reference to FIGS. 7-9). Between the two extreme positions, the pivot assembly will move through the position shown in FIG. 8 (which is also an unlocked position) in which the sperrad teeth are all within the circle EZ. As seen in FIG. 9, in the locked position, the lower or end edge 62c of the trailing wing is engaged in the gap 34d defined by the leading edge of a tooth 34, thereby interfering with (and preventing) further rotation of the sperrads and the drum. During normal operation of the retractable (i.e., rotation of the drum and sperrad at less than a predetermined rotational locking speed), the spring 60 will pivot the pivot assembly out of the engagement zone, and thus out of the locking position, before the edge 62c of the trailing wing can be engaged by the sperrad tooth tip 34c. However, during a fall, rotation of the drum, and thus of the sperrad, in the direction indicate by the arrow R (FIG. 7), increases beyond the predetermined locking rotational speed, and the spring 60 will not be able to move sperrad back within the diameter of the engagement zone circle EZ before the next tooth 34 approaches the edge of the trailing wing, and the edge 62c of the trailing wing therefore will be engaged by the sperrad tooth gap to prevent further rotation of the drum. Thus further resistance to unwinding of the webbing from the drum will stop the fall. That is, the clutch will allow about 3½ feet (about 1 meter) of web or lanyard to be extracted from the retractable after lockup to reduce impact forces on the body of the wearer to an arrest force of under 900 lbs. (under 4 kN).

As can be appreciated, the locking speed which must be exceeded to prevent the spring from pivoting the sperrad to an unlocked position will depend on the force created by the accelerating mass of the pivoting drum (i.e., the falling of the wearer) and the strength of the spring 60 which is trying to move the drum back to the unlocked position. When the locking speed will be exceeded with the force of the falling worker exceeds the spring strength.

As can be seen, unlike conventional retractables, the retractable 10 omits traditional pawls. The locking method to stop rotation is based on the rotational mechanical relationship between the stop cap 50 and the pivot assembly (which includes the drum assembly 24 and the sperrads 32). In essence, the stop cap 50 operates as a fixed pawl for locking purposes and the drum/sperrad pivots relative to the stop cap. This is accomplished by supporting the drum assembly 24 and sperrads on the inner frame 16, and pivotally connecting the inner frame 16 to the stop cap 50. With reference to the orientations shown in FIGS. 7-9, the torsional spring 60 presses the drum assembly 24 to hold the sperrad teeth 34 against the inside of surface 62a of the wing 62 on the right side of the stop cap 50 at position P1, as seen in FIG. 7. The drum, as noted above, is rotationally fixed to the sperrad using compressed Bellville washers. As the sperrad teeth 34 rub against the inside of the stop cap wing surface 62a during rotation of the drum and sperrad, the drum oscillates back and forth inside the stop cap. Rotation of the sperrad clockwise to the position P2 shown in FIG. 8 causes the inner frame 16, and hence the drum-sperrad assembly, to pivot about the top shaft 52. Notice that at the point of maximum pivotal rotation (FIG. 9), the tip of the sperrad at position P2 has caused the tip of the sperrad at location P3 to move into the circle EZ of the engagement zone, the annular width of which is defined by the tips of the teeth 34. As seen in FIG. 8, this pivoting of the inner frame and the drum-sperrad assembly relative to the stop cap has caused the sperrad teeth on the left side of the sperrad (with respect to FIG. 8) to extend outside of the engagement zone circle EZ, as seen at location P4. With the sperrad teeth extending outside of the engagement zone circle, the unit will lock up (i.e., cease to rotate) in the event of a failure of the drum assembly 24 to pivot about the top shaft 52. This is so, because the leading edge 34b of the next tooth 34 of the sperrad will engage the lower edge of the stop cap wing, and the stop cap wing will prevent further or continued rotation of the drum-sperrad assembly about the axle 26. Note that in this embodiment, the retraction spring 36 of the drum assembly 24 is always working against the torsional spring 60 in the stop cap 50. The spring force keeps the sperrad tooth tip always rubbing against the inside of the right (leading) wing (with reference to FIGS. 7-9) of the stop cap between locations P1 and P2 until a sudden pull (as in the case of a fall) on the webbing W causes the sperrad tips and drum assembly to move away from the stop cap at location P2 and engage the stop cap at location P5, as seen in FIG. 9. This sudden pull on the web W increases the rotational speed of the sperrad and forces the sperrad into total engagement with the stop cap at location P5 (FIG. 9). Notice that in this embodiment, the force due to the tension on the webbing drives the gap 34d between the sperrad teeth directly into engagement with the stop cap and does not require a pawl to leave the cam surface by centrifugal motion to create engagement as in retractables with cam driven pawl designs. In normal use, the rotational rate of the drum and sperrad and its action against the inside of the stop cap is insufficient to overcome the return force of the torsion spring 60, which would otherwise cause a total engagement of the sperrad with the stop cap (and thus lock up the retractable).

An alternative embodiment of the retractable is shown in FIGS. 10A-13. The retractable 110 is generally similar to the retractable 10. The retractable 110 comprises a housing which contains the components of the retractable. As with the retractable 10, the retractable 110 includes an inner frame 116 supporting an axle 126 on which a drum 124 is mounted, such that the drum can rotate within the housing relative to the inner frame 116. As is known, a cable or lanyard 125 is wound on the drum 124. Opposed sperrads 130 are mounted to the shaft on opposite sides of the drum 124. A spiral power spring 136 is mounted on the axle 126 on one side of the drum adjacent one of the sperrads 132. A Belleville spring washer 140 is mounted on the axle 126 on the opposite side of the drum 124. The Belleville washer 140 ensures a friction fit, such that the drum 124 will be frictionally fixed rotationally relative to the sperrads 132 by, such that the drum and sperrads will rotate together and in unison. The retractable 110 differs from the retractable 10 in part in that the retractable 110 includes only one Belleville washer 140 and only one power spring 136.

Figure 11:
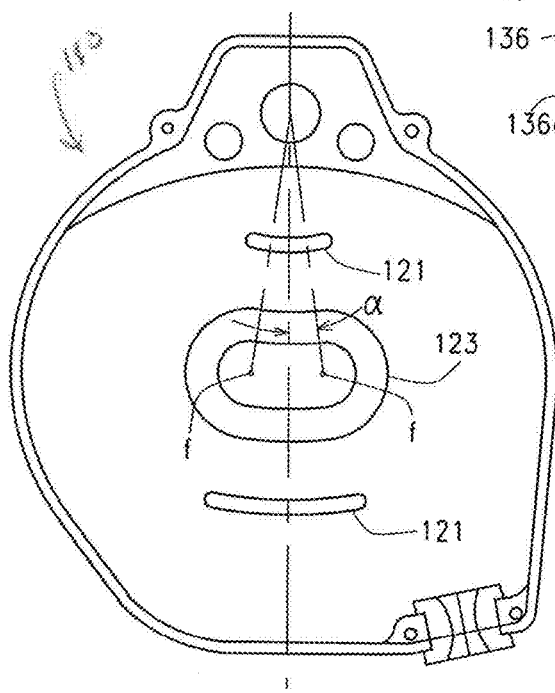
FIG. 11 is a side elevational view of one half of the retractable housing.
Figure 26:
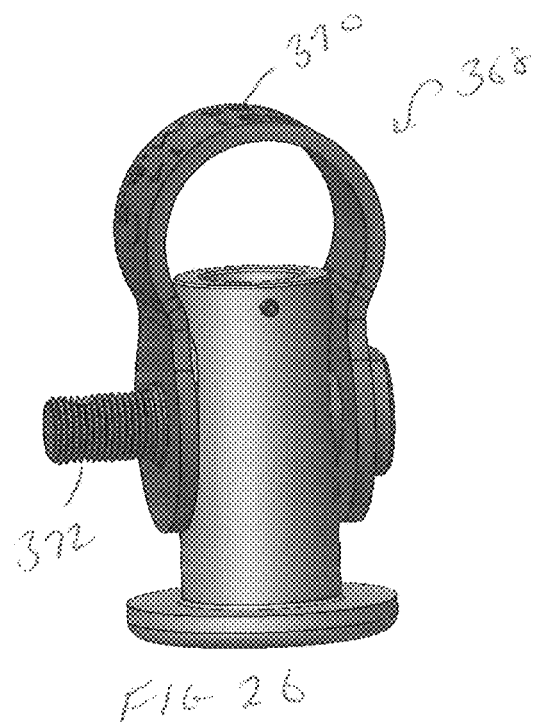
FIG. 26 is a perspective view of an alternative swivel top which can indicate when a fall has occurred.
Figure 27:
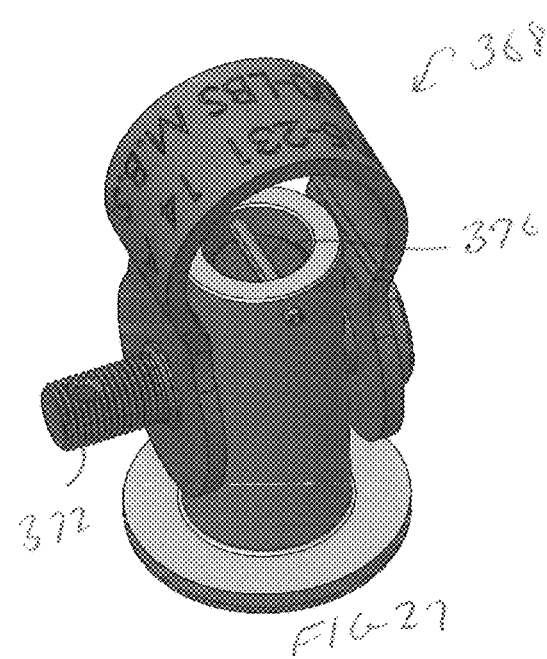
FIG. 27 is a top perspective view of the swivel top.
Figure 28:
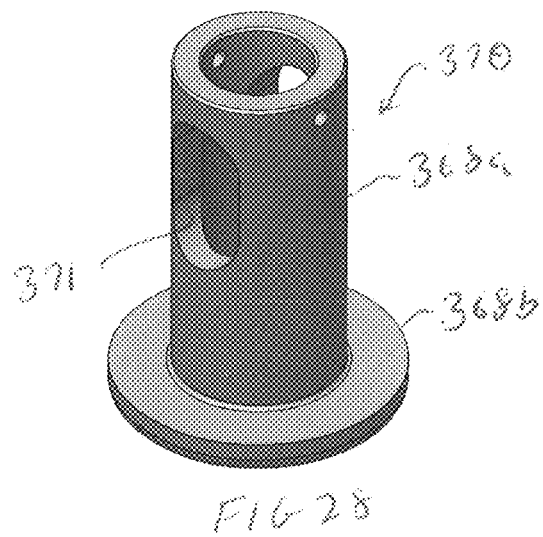
FIG. 28 is a perspective view of a body of the swivel top.
Figure 29:
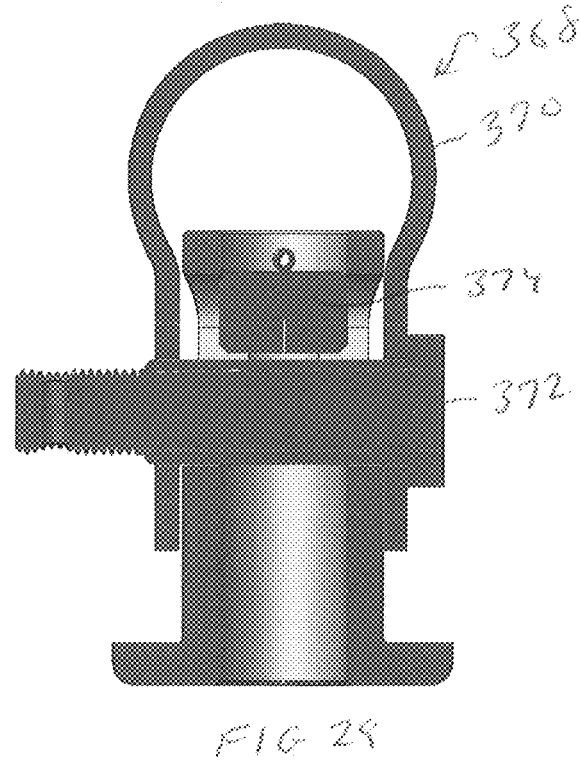
FIG. 29 is a cross-sectional view of the swivel top.

The retractable 110 also differs from the retractable 10 in the configuration of the inner frame 116. As seen in FIGS. 12 and 13, the inner frame 116 comprises opposed side members 118, each of which has a generally circular mid-section 118*a* (to which the shaft 126 is mounted), a neck 118*b* extending upwardly from the mid-section 118*a*, and a leg 118*c* extending downwardly from the mid-section 118*a*. The side members 118 include portions 119 in both the neck 118*b* and the leg 118*c* of the side members which are stepped out of the plane of the side member portions 118*a* and 118*c*. A top member 118*d* extends between the ends of the neck 118*b*, and a bottom member 118*e* extends between the ends of the legs 118*c*. Thus, the inner frame 116 surrounds the drum, sperrads, power spring, and Belleville washer. The housing for the power spring, and thus, the power spring 136, is fixed to the inner frame 116 by means of a fastener 136*a* which extends through the frame leg 118*c* into the power spring housing. The projecting portions 119 of the inner frame are provided a narrower wear surface to rub on plastic ribs 121 (FIGS. 10B and 11) on an inner surface of the housing. This reduces contact friction between the housing (which can be made of plastic) and the pivoting inner frame 116 in case the plastic housing touches the frame. As seen in FIG. 11, the housing includes an elongate generally oval receiving area 123 which receives the enlarged ends of the shaft 126. The ribs 121 include an upper rib above the receiving area 123 and a lower rib below the oval receiving area. The ribs 121 and the receiving area 123 are all slightly arced, to accommodate the pivotal motion of the pivot assembly (including the inner frame, the shaft, the drum, and the sperrads). The elongate oval receiving area 123 can define an angle α from its center line to an inner edge of about 5° to about 10°, and preferably about 8°, from the foci f or centers of the circles defining the ends of the oval receiving area.

The retractable 110 includes a stop cap 150 which is fixed in place in the housing 114, as seen in FIGS. 12 and 13. The stop cap 150, like the stop cap 50, comprises a body having side walls 156*a*, end walls 156*b* and a top 156*c*. Leading and trailing wings 162*a,b* extend from the ends of the end walls 156*b*. The inner frame 116 is pivotally mounted to the stop cap 150 by pin 172 which extends between the upper ends of the inner frame arms 118*b* and the opposite side walls 156*a* of the stop cap 150.

The retractable defines an engagement zone, the inner edge of which is defined by a circle EZ which is centered on the center CR of the retractable and has a radius which extends from the retractable center CR to the end of the stop cap wings 162. When the axis of the inner frame 116 is aligned with the center line CL of the retractable, the center of the drum CD is aligned with the center CR of the retractable.

The operation of the retractable 110 is identical to the operation of the retractable 10. A biasing spring (similar to the spring 60) biases the inner frame 116 to the position shown in FIG. 13 in which two of the teeth 134 of the sperrads 132 (at positions T1 and T2) are urged against the inner surface of the leading wing 162*a*, and in which the drum center CD is to the right of the retractable center CR (with reference to FIG. 13). In this position, the sperrad tooth at position T3 below the trailing wing 162*b* is inside of the engagement zone circle EZ. As the drum 124 and sperrads 132 rotate clockwise (with reference to FIG. 13), the interaction of the sperrad teeth 134 with the inner surface of the leading wing 162*a* as the teeth move from position T1 to T2 causes the frame 116 to pivot to the left (with reference to FIGS. 12 and 13) such that the sperrad teeth 134 extend through the engagement zone circle EZ and enter the engagement zone, as seen in FIG. 12, at position T4. In this position, if the drum is rotating sufficiently fast (such as during a fall), or if the drum is unable to pivot so that the tooth at position T3 can move underneath the stop cap (i.e., within the engagement zone circle EZ), the edge of the trailing wing 162*b* will engage the teeth, as seen in FIG. 14, to force the sperrad/drum sub-assembly into full engagement with the stop cap such that the edge of the stop cap engages or is received in the pocket 134*e* of a tooth 134 in order to prevent rotation of the sperrads and the drum. In normal operation, the sperrad/drum sub-assembly will pivot about the pin 172 relative to the stop cap 150 between the positions shown in FIGS. 12 and 13 due to the force of the biasing spring and the engagement of the sperrad teeth with the stop cap leading wing 162*a*. Thus, the sperrad teeth will not engage the edge of the trailing wing 162*b*, and the drum will be able to rotate in an unwinding direction.

A third embodiment of the retractable is shown in FIGS. 15-24B. The retractable 210 is generally similar to the retractables 10 and 110. The differences, however, will be noted.

The retractable 210 includes a housing (FIG. 24A) in which an inner frame 216 is fixedly mounted. The inner frame 216 can be formed from one piece of material (such as a suitable metal) which is formed (such as by bending or molding) into shape. The frame includes a top member 216*a*, opposed side members 216*b* extending from side edges of the top member 216*a*, and bottom members 216*c*1, 216*c*2 which extend inwardly toward each other from the bottom edges of the side members 216*b* and overlap each other. As seen in FIGS. 17 and 18, the side members 216*b* are generally rectangular, but have long edges which slope inwardly from a midpoint of the edges to the top and bottom of the side members. As seen in FIGS. 15 and 19, the bottom member 216*c*1 has a hole 217*a* spaced inwardly from an end of the bottom member; and the bottom member 216*c*2 has a slot 217*b* extending inwardly from an end of the bottom member 216*c*2. The slot 217*b* is aligned with the hole 217*a*, as best seen in FIG. 21. The two part bottom member allows from the inner frame side members 216*b* to be spread part, as necessary, to facilitate assembly of the retractable. A fastener (such as a bolt) can be passed through the aligned hole and slot to fixedly secure the bottom members 216*c*1, 216*c*2 together.

With reference to FIGS. 21-23, a center shaft or axle 226 extends through the opposite side members 216*b* of the inner frame. Like the axle 26, the axle 226 includes an enlarged end 226*a* at one end of the axle and an enlarged cap nut 228 at the opposite end. The enlarged end 226*a* and cap nut 228 define bearing surfaces, as described above with the axle 26. The axle 226 is hollow at at least one end thereof, where the axle externally threaded to receive the cap nut 228. The internal threads of the axle receive a left hand threaded screw 229 which holds the cap nut 228 in place against the inner frame side member 216*b* to prevent axial motion of the axle relative to the inner frame during a fall arrest. Belleville support spacers 229*a,b* are journaled about the axle adjacent the inner edges of the enlarged end 226*a* and the cap nut 228.

A drum assembly 224 is mounted on the shaft 226. The drum assembly 224 includes a drum body 224*a* (comprised of two opposed half-drum members). Unlike the retractables 10 and 110, the drum assembly 224 does not include separate drum walls. Rather, the walls of the drum assembly are defined by opposed sperrads 232. The drum body 224*a* is preferably formed from aluminum, but can be formed from any desired material. Hence, the drum assembly includes metal drum gears 231 adjacent outer surfaces of the drum body. The drum body includes a recess on each outer surface which is shaped to receive the drum gears 231. Thus, the drum gears and drum body are positionally fixed relative to each other, and operate as a single unit. Friction discs 230 are positioned between the drum gears 231 and the inner surfaces of the sperrads 226. A Bellville washer 234 and a spacer 236 are positioned between the outer surfaces of the sperrads and the sleeves/spacers 229*a,b*. As shown, the Belleville washer 234 is on the side of the drum assembly proximate the enlarged end 226*a* of the axle; and the spacer 236 is on the side of the drum assembly proximate the cap 228.

A spring assembly 238 is positioned between the inner frame side member 216*b* (on the side with the axle cap 228) and the spacer 236. That is, as seen, for example in FIG. 21, the spring assembly 238 is between the frame side members 216*b*, and adjacent the noted side member. The spring assembly 238 includes a spring housing 238*a* and a spring housing cap 238*b* (FIG. 16) which, in combination, define a space that receives a coiled spring (not shown). The spring housing 238*a* is fixed to the inner surface of the frame side member 216*b*, for example, by means of screws. One end of the spring is fixed to the perimeter of the spring housing, and the opposite end of the spring is fixed to the axle 226 (such as by extending through a slot in the axle), so that the spring is operable to rewind the lifeline (cable, webbing, etc.) onto the drum after having been unwound from the drum.

The sperrads 232 are keyed to the axle 226 such that the sperrads and axle rotate in unison. As seen in FIG. 21, the sperrads each include a central portion having a diameter sized to engage the friction discs 230 and the Belleville washer 234/spacer 236. A rib or inwardly directed projection is formed at the periphery of the central portion of the gears 231 and engages the radially outer edge of the drum 224*a*. Lastly, an outer portion of the sperrad extends radially from the inwardly directed projection to define an annular wall having an inner diameter approximately equal to the outer diameter of the drum body 224*a*. These annular walls are spaced from the side edge of the drum body by the inwardly directed projection. Thus, as can be seen, the drum body 224*a*, the sperrads' inwardly directed projections, and the sperrads outer annular portion define a U-shaped area which receives the life line.

When assembled, the cap nut 228, when tightened, will compress the Belleville washer such that the friction discs will frictionally connect the drum body 224*a* to the sperrads 232 (which define walls for the drum assembly). Thus, the drum body 224*a* and the sperrads 232 will rotate in unison. Further, because the sperrads are keyed to the axle, as the drum rotates, the axle will rotate. Hence, as the lifeline is extended (i.e., unwound from the drum), the axle will rotate to wind the spring in the spring housing. When tension on the lifeline is released, the spring in the spring housing can then operate to rotate the axle in the opposite direction to rewind the lifeline onto the drum.

As best seen in FIG. 17, the sperrads 232 include a plurality of teeth 240 extending from the outer annular portion. Each tooth 240 comprises a trailing edge 240*a* which is generally arced and a leading edge 240*b* which extends from the end of the trailing edge radially inwardly toward the perimeter of the sperrad's outer annular portion from a tip 240*c* of the tooth. As seen, the leading edge of each tooth also extends rearwardly, such that the junction between the leading edge 240*b* of the tooth and the sperrad peripheral portion is radially inside of the trailing edge 240*a* defining an area 240*d* under or between each tooth 240. Additionally, the trailing edge 240*a* of each tooth extends from the base or inner end of the leading edge 240*b* of an adjacent tooth. The teeth are evenly spaced about the sperrad 232.

The retractable 210 includes a stop member (or stop cap) 250 which is pivotally mounted above the sperrads and between the side members 216*b* of the inner frame. The stop member 250 is shown to be a stop cap, which overlaps or covers only a portion of the sperrads. As seen in FIG. 15, the side walls of the stop cap are spaced apart a distance sufficient such that the two sperrads are received beneath the stop cap and between the stop cap side walls 254. The stop cap 250 has upper surfaces 252*a,b* which slope downwardly from an apex 252*c* to an end edge 252*d*. The downwardly sloping upper surfaces 252*a,b* define leading and trailing portions 257*a,b*, respectively, of the stop cap, and the leading and trailing portions end in leading and trailing edges 259*a,b*, respectively, of the stop cap. Sidewalls 254 extend downwardly from the top surfaces and have a bottom edge 254*a* which define an arc of a circle that is generally concentric with the sperrads 232.

An upper shaft 256 extends between the opposite side members 216*b* of the inner frame below the inner frame top member 216*a*. The side walls 254 of the stop cap include aligned openings through which a top shaft 256 extends, and which defines a pivot axis for the stop cap 250. A torsion spring 260 is received about the top shaft 256. The torsion spring 260 has legs 260*a,b* extending from a spiral portion. With reference to FIG. 18, the leg 260*b* engages the underside of the inner frame top surface 216*a* and the leg 260*a* engages the stop cap, as best seen in FIGS. 15 and 20. Thus, the torsion spring 260 is operable to bias the stop cap 250 to a normal or rest position. As seen in FIGS. 17, 18 and 24A in which the sperrad (and hence the drum) can rotate in the housing, as will be discussed more fully below.

As seen in FIGS. 15, 16 and 20, the upper surface 252 of stop cap 250 is effectively divided into thirds, and includes outer portions and a central portion offset (shown as being sunken) relative to the outer portions. As can be appreciated, having a central portion offset from the outer portions provides rigidity to the stop cap, and thus allows for the stop cap to be made of a lighter weight and thinner material. Provided the stop cap is of sufficient strength and thickness, the stop cap could also be made with a flat leading edge without the necessity of adding the frame.

Lastly, the inner frame 216 has an opening in its top surface 256*a* through which the shaft 268*a* of a swivel top 268 passes. The swivel top 268 further includes a bottom disc 268*b* which is positioned beneath the inner frame upper surface 216*a*. A swivel yoke 270 is pivotally connected to the swivel top 68 by means of a pin 272 (such as a clevis pin).

The retractable 210 is shown in an unlocked position in FIG. 24A in which the drum can rotate in an unwinding direction (as shown by the arrow R); and in a locked position in FIG. 24B in which the drum is prevented from rotating in the unwinding direction. With reference to FIGS. 24A,B, the retractable has an engagement zone defined by an imaginary circle EZ which is aligned with the center CR of the retractable and which is concentric with the drum. The circle EZ has a radius which extends from the retractable center CR to the end of the end edge 252d of the stop cap 250. The circle EZ defines the inner perimeter of the engagement zone.

The stop cap 250, and more particularly, the surfaces 252a,b of the stop cap, are sized and shaped such that as the drum and sperrad rotate relative to the stop cap 250 in the direction of the arrow R, the end edge 252d (or leading edge 259a) of a leading side or portion 257a of the stop cap (the right half of the stop cap with respect to FIGS. 24A,B) will ride on the teeth 240 of the sperrad 232. As noted, the stop cap 250 pivots relative to the sperrads 232 about a pivot axis defined by the shaft 52 as the sperrads rotate about the center shaft 226. As noted above, the spring 260 biases the stop cap to the position shown in FIG. 24A to urge the inner surface of the stop cap surface 252a against the sperrad tooth surface 240a. As the sperrad and drum rotate in an unwinding direction indicated by the arrow R (which is in a clockwise direction with reference to FIGS. 24A,B), the leading edge 240a of the teeth will push against the inner surface of the leading (right side) surface of the stop cap, causing the stop cap to pivot about the upper shaft 256 to the locked position shown in FIG. 24B, in which the edge 252d (or trailing edge 259b) of the trailing side or portion 257b of the stop cap is within the engagement zone EZ. When the tip 240d of a tooth clears the edge 252d/259a of the leading side 257a of the stop cap, the spring 260 will force the stop cap to pivot in the opposite direction to return the stop cap to the position shown in FIG. 24A in which the trailing edge 279b of the cap is outside the engagement zone EZ.

As can be appreciated, this back and forth pivoting of the stop cap causes the edge 252d of the trailing edge of the stop cap to move in and out of the engagement zone back EZ, and thus to pivot between a locking position (FIG. 24B) in which the end edge 252d of the stop cap is within the engagement zone circle EZ, and an unlocked position (FIG. 24A) in which the end edge 252d of the trailing side of the stop cap is outside the engagement zone circle EZ. As seen in FIG. 24B, in the locked position, the lower or end edge 252d of the trailing side of the stop cap will be engaged in the gap 240d by continued rotation of the sperrad in the direction of the arrow R. As can be appreciated, when in the locked position, the stop cap will interfere with (and prevent) further rotation of the sperrads and the drum until the friction disc forces are overcome, at which point, the drum only will rotate to absorb energy.

During normal operation of the retractable (i.e., rotation of the drum and sperrad at less than a predetermined rotational locking speed), the spring 260 will pivot the stop cap out of the engagement zone, and thus out of the locking position, before the area 240d beneath a tooth 240 can be engaged by the edge 252d of the stop cap. However, during a fall, rotation of the drum, and thus of the sperrad, in the direction indicate by the arrow R (FIGS. 24A,B), increases beyond the predetermined locking rotational speed, and the spring 260 will not be able to pivot the stop cap out of the engagement zone EZ before the next tooth 240 approaches the edge 252d of the trailing portion of the stop cap, and the stop cap will engage by the sperrad tooth gap 242d to prevent further rotation of the drum. Thus further resistance to unwinding of the webbing from the drum will stop the fall. That is, the clutch can allow as much as 3½ feet (about 1 meter) of web or lanyard to be extracted from the retractable after lockup to reduce impact forces on the body of the wearer to an average arrest force of under 900 lbs. (under 4 kN).

As can be appreciated, the locking speed which must be exceeded to prevent the spring from pivoting the sperrad back to an unlocked position will depend on the rotational moment of the stop cap created by the acceleration of the falling worker and the strength of the spring 60 which is trying to move the drum back to the unlocked position. When the locking speed is exceeded, the centrifugal forces on the stop cap will exceed the spring strength.

A variation of the retractable 210 is shown in FIGS. 25A,B. the retractable 210' is substantially similar to the retractable 210. Thus, the same reference numbers are used for the same parts. As can be seen, the retractable 210' differs from the retractable 210 in that the power spring 238 is mounted to the outside of the frame 216, rather than to the inside of the frame. Moving the spring to the outside of the frame simplified assembly of the retractable and reduces loading on the frame top member 216a. The repositioning of the power spring 238 required a modification to the axle. In the retractable 210', the direction of the axle 226' is reversed relative to the direction of the axle 226 in the retractable 210. Thus, the nut 228 and screw 229 are adjacent the same frame side member 216b as the Belleville washer 234. Compared to the axle 210, the axle 210' has a longer head 226a' which extends through a central opening in the spring assembly 238. As in the retractor 210, the head 226a' of the axle 226 engages the outer surface of a spacer 229a, which in turn bears against a Belleville washer 236 adjacent an outer surface of a sperrad 232. The operation of the retractor 210' is identical to that of the retractor 210, and thus will not be described herein.

Figures 30, 31:
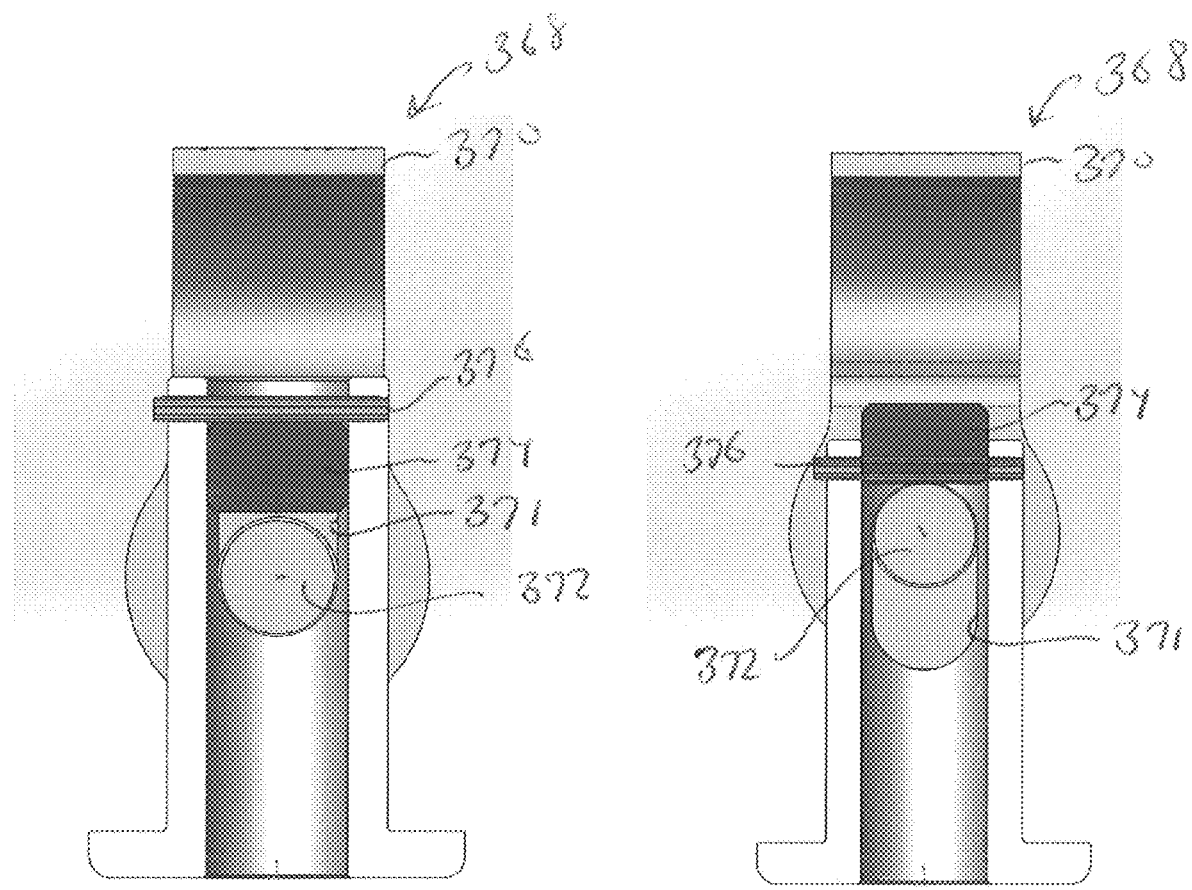
FIGS. 30 and 31 are cross-sectional views of the swivel top, taken 90° relative to FIG. 29, and showing the swivel top before a fall and after a fall, respectively.

FIGS. 27-31 show a fall indicating swivel top which can be used with any of the retractors disclosed herein (and which could be modified to be used with a variety of retractors). The fall indicating swivel top 368 comprises a main shaft or body 368a in the form of a hollow tube having a footing 368b at the bottom thereof. The footing 368b engages the bottom side of the stop member as seen in FIG. 4, or the bottom side of the frame as seen in FIGS. 18 and 21. The body 368a has opposed elongate tracks 371 defined by slots. A pin 372 to which the swivel yoke 370 is connected passes through the slots. Because the slots 371 are elongate, the pin 372, and hence the yoke 370) can travel vertically (or axially) relative to the swivel connector body 368a. An indicator block 374 is received within the body 368a, and sits on top of the pin 372. Lastly, a stop pin 376 extends across the top of the indicator block, slightly below the top of the body 368a. The indicator block is sized, such that when the pin 372 is at the bottom of the slot 371 (i.e., at its lowest possible position relative to the body 368a), the top of the block will loosely engage the underside of the stop in 376. Hence, in this normal position (shown in FIG. 30), the swivel yoke will not move substantially relative to the body 368. The stop pin is constructed such that, in a fall, the stop pin will break, thereby allowing the indicator block to pass through the open top of the body to be visible, as shown in FIG. 31. Further, the broken stop pin will engage the indicator block to prevent it from falling back into the swivel connector body 368a. Thus, the swivel connector 368 will easily enable someone to determine if a retractable has been subject to a fall, and thus may require maintenance.

It will be appreciated, that the pin 372 operates as a support for the indicating block 376. The pin 372 could thus be replaced with any structure which will support the indicating block, to which the yoke 370 can be connected, and which will interact with the track. For example, the pin 372 could be replaced with fingers which are received in the tracks 371.

As can be seen, unlike conventional retractables, the retractables disclosed herein omit traditional pawls. The locking method to stop rotation is based on the rotational mechanical relationship between the stop cap on the one hand and the drum/sperrad assembly on the other hand. In essence, in the retractables 10 and 110, the stop cap operates as a fixed pawl for locking purposes and the drum/sperrad pivots relative to the stop cap. This is accomplished by supporting the drum assembly and sperrads on the inner frame, and pivotally connecting the inner frame to the stop cap. With reference to the orientations shown in FIGS. 7-9, the torsional spring 60 presses the drum assembly 24 to hold the sperrad teeth 34 against the inside of surface 62a of the wing 62 on the right side of the stop cap 50 at position P1, as seen in FIG. 7. The drum, as noted above, is rotationally fixed to the sperrad using compressed Bellville washers. As the sperrad teeth 34 rub against the inside of the stop cap wing surface 62a during rotation of the drum and sperrad, the drum oscillates back and forth inside the stop cap. Rotation of the sperrad clockwise to the position P2 shown in FIG. 8 causes the inner frame 16, and hence the drum-sperrad assembly, to pivot about the top shaft 52. Notice that at the point of maximum pivotal rotation (FIG. 9), the tip of the sperrad at position P2 has caused the tip of the sperrad at location P3 to move into the circle EZ of the engagement zone, the annular width of which is defined by the tips of the teeth 34. As seen in FIG. 8, this pivoting of the inner frame and the drum-sperrad assembly relative to the stop cap has caused the sperrad teeth on the left side of the sperrad (with respect to FIG. 8) to extend outside of the engagement zone circle EZ, as seen at location P4. With the sperrad teeth extending outside of the engagement zone circle, the unit will lock up (i.e., cease to rotate) in the event of a failure of the drum assembly 24 to pivot about the top shaft 52. This is so, because the leading edge 34b of the next tooth 34 of the sperrad will engage the lower edge of the stop cap wing, and the stop cap wing will prevent further or continued rotation of the drum-sperrad assembly about the axle 26. Note that in this embodiment, the retraction spring 36 of the drum assembly 24 is always working against the torsional spring 60 in the stop cap 50. The spring force keeps the sperrad tooth tip always rubbing against the inside of the right (leading) wing (with reference to FIGS. 7-9) of the stop cap between locations P1 and P2 until a sudden pull (as in the case of a fall) on the webbing W causes the sperrad tips and drum assembly to move away from the stop cap at location P2 and engage the stop cap at location P5, as seen in FIG. 9. This sudden pull on the web W increases the rotational speed of the sperrad and forces the sperrad into total engagement with the stop cap at location P5 (FIG. 9). Notice that in this embodiment, the force due to the tension on the webbing drives the gap 34d between the sperrad teeth directly into engagement with the stop cap and does not require a pawl to leave the cam surface by centrifugal motion to create engagement as in retractables with cam driven pawl designs. In normal use, the rotational rate of the drum and sperrad and its action against the inside of the stop cap is insufficient to overcome the return force of the torsion spring 60, which would otherwise cause a total engagement of the sperrad with the stop cap (and thus lock up the retractable).

In the retractables 210 and 210', instead of the drum/sperrad assembly pivoting relative to the stop cap, the stop cap pivots relative to the drum/sperrad assembly.

The design configurations of the retractables will prevent rotation of the drum when mechanical issues cause the drum and sperrad to become inoperable (i.e., prevent pivoting of the drum and sperrad). This can occur, for example, if the inner frame of the retractables 10, 110 is frozen in position relative to the stop cap or if the stop cap 250 of the retractable 210 is frozen in position relative to the sperrad 232, such as by ice, or if debris blocks pivotal motion of the inner frame (for the retractables 10, 110) of the stop cap (for the retractable 210). Normal locking cannot occur until the normal pivoting action caused by engagement of the sperrad tooth and the inside of the leading edge of the stop cap causes the tooth tip approaching the trailing edge of the stop cap to actually rise above (or shift outside of) the circle EZ. In the retractables 10, 110, whenever the tooth tip extends beyond the engagement zone circle EZ on the trailing side of the engagement zone, the tooth tip moves into the engagement zone. In the retractable 210, whenever the stop cap edge 252d extends into the engagement zone circle EZ on the trailing side of the engagement zone, the top cap edge tooth tip moves into the engagement zone. Therefore, anything (such as, contaminates, a broken spring, ice, mechanical damage, etc.) that prevents pivoting of the drum/sperrad (for the retractable 10, 110) or of the stop cap (for the retractable 210) from the locking position to move to the unlocked position locks the retractable. Hence, webbing will not be able to be extracted from the retractable if there is mechanical damage to the retractable. This is because relative position of the stop cap and sperrad tooth gap relative to each other will force the sperrad tooth to engage the stop cap upon rotation of the drum. Thus, if a worker pulls on the web and the webbing will not come out of the retractable, it means there is a malfunction of the working elements and this prevents the worker from being able to use a damaged or non-functioning unit.

Lastly, the use of the fall indicator in the swivel connector will let management or inspectors know that a fall has occurred on the system.

As can be seen from the foregoing, the retractables 10, 110, 210 do not include pawls, as do currently available retractables, to stop rotation of the drum in case of a fall. Rather, as noted above, the stop cap engages the sperrad teeth to stop the rotation of the drum in a fall. The elimination of the smallest working element (the pawls) from current retractables and transferring their function to larger working elements (the drum or stop cap) eliminates the inability to further reduce the size and weight of retractables. Thus, for example, personal retractables which are normally limited by pawl strength requirements to diameters of about 3.5" or larger can now be reduced even further with the only limiting factor being the desired length of the specified webbing.

A major difference between the retractables 10, 110 on the one hand, and the retractable 210 on the other, is that in the retractables 10, 110, the inner frame (with the drum and sperrads) pivots relative to the housing and the stop cap. In the retractable 210, the inner frame is fixed relative to the housing, and the stop cap pivots relative to the sperrads. Additionally, in the retractable 210, the drum side walls have been removed. Instead, the two sperrads 232 act as the drum side supports or side walls. This makes the retractable 210 mechanically simpler (in that it has fewer parts), but also provides a major operational advantage over other small retractables. Most small (back mount) retractables are built without internal shock absorbers in order to reduce size and weight of the retractable. For back mount retractables with the anchorage end (snap end) of the retractable assembly usually connected over the workers head, the shock absorber must be located so that it pulls from the back D-ring attachment end rather than the snap attachment end. Otherwise in a fall, as the web or cable in the unit pays out, it will be dragged across the leading edge and can be easily damaged and weakened. For this reason, a small retractable with an internal shock absorber that pays out of the retractable assembly is a safer choice. The retractable 210 is designed for this purpose. When an internal shock absorber is used, a certain amount of cable must be kept in reserve on the drum in order for the unit to have shock absorption capabilities if a fall occurs when the cable is pulled all the way out. For this reason a "false" end must be created which stops the cable extraction for normal use but will allow additional extraction to activate the shock absorber in case of a fall. The mechanism for doing this is typically banding layers of cable together with a shear band or installing a shear pin across the drum which will break under fall arrest loads allowing more cable to extract. These methods are complicated and bulky. Another way of achieving this is to pre-wind the spring so that it bottoms out before the cable bottoms out. That way, in case of a fall at full extension, the spring simply pulls loose from the axle allowing additional revolutions of the drum. The problem with this is that regulations require that in a no free-fall drop, the unit must not be mechanically damaged and must be capable of retracting the cable after the fall. By disconnecting the drum side plates from the drum center and using the sperrads 232 as the drum side plates, the spring of the spring assembly 238 can to provide the false end without pulling the spring out of the axel during a fall.

In this the retractable 210, the spring center is connected to the axle which is connected to the sperrads, so all of these parts rotate together. The drum center is disconnected from the axle and is held in relation to the sperrads only by the friction of the shock absorbing or friction discs 230. Upon a fall event, the stop cap will engage the sperrads, as discussed above, to stop the rotation of the sperrads, the spring, and the axle. At this point the drum center begins to rotate to absorb energy. But also note that the spring does not have to rotate further to allow the drum center to continue to rotate. Once the fall is arrested, the spring will still be fully functional. However, the spring now does not now have a many pre-wraps with respect to the cable and drum as it had originally. But because the spring can be more efficiently used it can have additional pre-wraps which in conventional units had to remain unused to allow for future shock absorption. This way the retractable 210 is still fully functional allowing the cable to be retracted by the spring after a no free-fall event.

As various changes could be made in the above constructions without departing from the scope of the invention, it is intended that all matter contained in the above description or shown in the accompanying drawings shall be interpreted as illustrative and not in a limiting sense. For example, the assembly could comprise a fixed rigid outer frame rather than a stop cap that provides the stopping surface (i.e., the lower or end edge of the stop cap). Such an outer frame could go all the way around the inner pivoting frame. These examples are illustrative only.

The invention claimed is:

1. A retractable comprising:
    a housing;
    an inner frame separate from and mounted within said housing; said inner frame comprising opposed side members and a top member extending between upper ends of the side members;
    a drum assembly and first and second sperrads mounted to said inner frame between said side members to rotate about an axis relative to said inner frame, said first and second sperrads being positioned on opposite sides of said drum assembly; said drum assembly and said sperrads being rotationally fixed relative to each other to form a drum/sperrad assembly; said sperrads each having a sperrad body and a plurality of sperrad teeth extending from a periphery of said sperrad body; and
    a stop member mounted within said housing and comprising a leading portion and a trailing portion extending in an opposite direction from said leading portion; said leading portion and said trailing portion each being defined by a downwardly sloping upper surface, end edges at ends of said upper surfaces, and side walls extending downwardly from opposite side edges of the upper surfaces; said side walls defining a distance therebetween such that said first and second sperrads are positioned beneath the upper surfaces of said leading and trailing portions and between the side walls, said upper surfaces each defining a central portion and outer portions on opposite sides of said central portion; said central portion being offset radially from said outer portions;
    said retractable defining a substantially circular engagement zone having an inner circumference defined by a circle which is substantially concentric with a center $C_R$ of the retractable and concentric with the drum assembly, and wherein the inner circumference of the engagement zone has a radius which extends from the retractable center $C_R$ to the end edges of said leading and trailing portions of said stop member when said drum/sperrad assembly and said stop member are in an unlocked position allowing for rotation of the drum/sperrad assembly;
    whereby, said drum/sperrad assembly and said stop member are pivotal relative to each other and wherein one of said drum/sperrad assembly and said stop member is movable relative to said engagement zone, such that said drum/sperrad assembly and said stop member move between an unlocked position in which a trailing edge of said stop member is outside of a circle defined by a periphery of said sperrad teeth and a locked position in which the trailing edge of said stop member is within said circle defined by said periphery of said sperrad teeth.

2. The retractable of claim 1 wherein said stop member is positionally fixed in said housing; said inner frame being pivotally connected to said stop member such that said inner frame, and hence said drum assembly and said sperrads, pivot relative to the stop member.

3. The retractable of claim 2 comprising a spring which engages said inner frame and said stop member to bias said inner frame, and hence said drum assembly and said sperrads, to said unlocked position.

4. The retractable of claim 1 wherein said inner frame is positionally fixed in said housing; said stop member being pivotally mounted in said housing to pivot relative to said drum/sperrad assembly.

5. The retractable of claim 4 comprising a spring which engages said inner frame and said stop member to bias said stop member to said unlocked position.

6. The retractable of claim 1 wherein said housing is made from plastic and said inner frame is made of metal.

7. The retractable of claim 1 wherein said drum assembly and said first and second sperrads are independent elements of said retractable; said drum assembly including first and second drum walls; said first sperrad being associated with said first drum wall and said second sperrad being associated with said second drum wall.

8. The retractable of claim 1 wherein said first and second sperrads define walls of said drum assembly.

9. The retractable of claim 1 wherein said stop member comprises a stop cap; said stop cap covering only a portion of said first and second sperrads.

10. The retractable of claim 1 wherein said sperrad teeth are sized such that when in said unlocked position, said sperrad teeth engage a surface of the leading portion of the stop member, and as said first and second sperrads rotate in an unwinding direction, said sperrad teeth push against said surface of said leading portion of said stop member to pivot said stop member to said locked position.

11. The retractable of claim 1 wherein said trailing portion of said stop member defines a diameter smaller than a diameter of said first and second sperrads.

12. The retractable of claim 1 further comprising an axle extending between said side members of said inner frame; said drum assembly and said first and second sperrads being mounted on said axle.

13. The retractable assembly of claim 1 wherein said housing surrounds and encloses said inner frame, drum assembly, and sperrads; said housing having an inner surface facing said inner frame and comprising a rib on said inner surface against which said inner frame slides during use of the retractable.

14. The retractable assembly of claim 13 wherein said side members of said inner frame includes projecting portions which engage said rib.

15. The retractable of claim 1 wherein said side members of said inner frame extend below said first and second sperrads; said inner frame further including a bottom member extending between said side members.

16. The retractable of claim 1 further comprising a return spring; said return spring being mounted on an inner surface of said inner frame between said frame and said drum/sperrad assembly.

17. The retractable of claim 1 further comprising a return spring; said return spring being mounted on an outer surface of said inner frame.

* * * * *